United States Patent
Tajima et al.

(10) Patent No.: US 8,879,134 B2
(45) Date of Patent: Nov. 4, 2014

(54) LASER SCANNING OPTICAL DEVICE

(75) Inventors: Naoki Tajima, Sagamihara (JP);
Yasushi Nagasaka, Okazaki (JP);
Takahiro Matsuo, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 281 days.

(21) Appl. No.: 13/442,654

(22) Filed: Apr. 9, 2012

(65) Prior Publication Data

US 2012/0275003 A1 Nov. 1, 2012

(30) Foreign Application Priority Data

Apr. 28, 2011 (JP) .................................. 2011-100376
Apr. 28, 2011 (JP) .................................. 2011-100378

(51) Int. Cl.
*G02B 26/08* (2006.01)
*G02B 26/12* (2006.01)
*B41J 2/47* (2006.01)

(52) U.S. Cl.
CPC *G02B 26/12* (2013.01); *B41J 2/473* (2013.01)
USPC ..................................................... 359/210.1

(58) Field of Classification Search
CPC ....... G02B 26/10; G02B 26/124; H04N 1/193
USPC ................... 359/196.1–226.3; 347/225, 233, 347/241–245
See application file for complete search history.

(56) References Cited

U.S. PATENT DOCUMENTS

2007/0019269 A1* 1/2007 Itabashi ........................ 359/196
2008/0062491 A1* 3/2008 Nakamura et al. ............ 359/200

FOREIGN PATENT DOCUMENTS

JP 2000-258710 9/2000
JP 2008-112111 5/2008

\* cited by examiner

*Primary Examiner* — Jennifer L. Doak
(74) *Attorney, Agent, or Firm* — Squire Patton Boggs (US) LLP

(57) ABSTRACT

A laser scanning optical device includes: alight source having a plurality of emission points; a plate-like light source holder which holds the light source in a center of the light source holder; a base arranged to face the light source holder; and an attitude adjusting part which adjusts an attitude of the light source by adjusting a tilt of the light source holder, and the attitude adjusting part includes an inclined part and an inclination conveying part, and adjusts the tilt of the light source holder with respect to the base by displacing an abutting position of the inclined part corresponding to the inclination conveying part along an inclined surface of the inclined part.

17 Claims, 20 Drawing Sheets

FIG.2
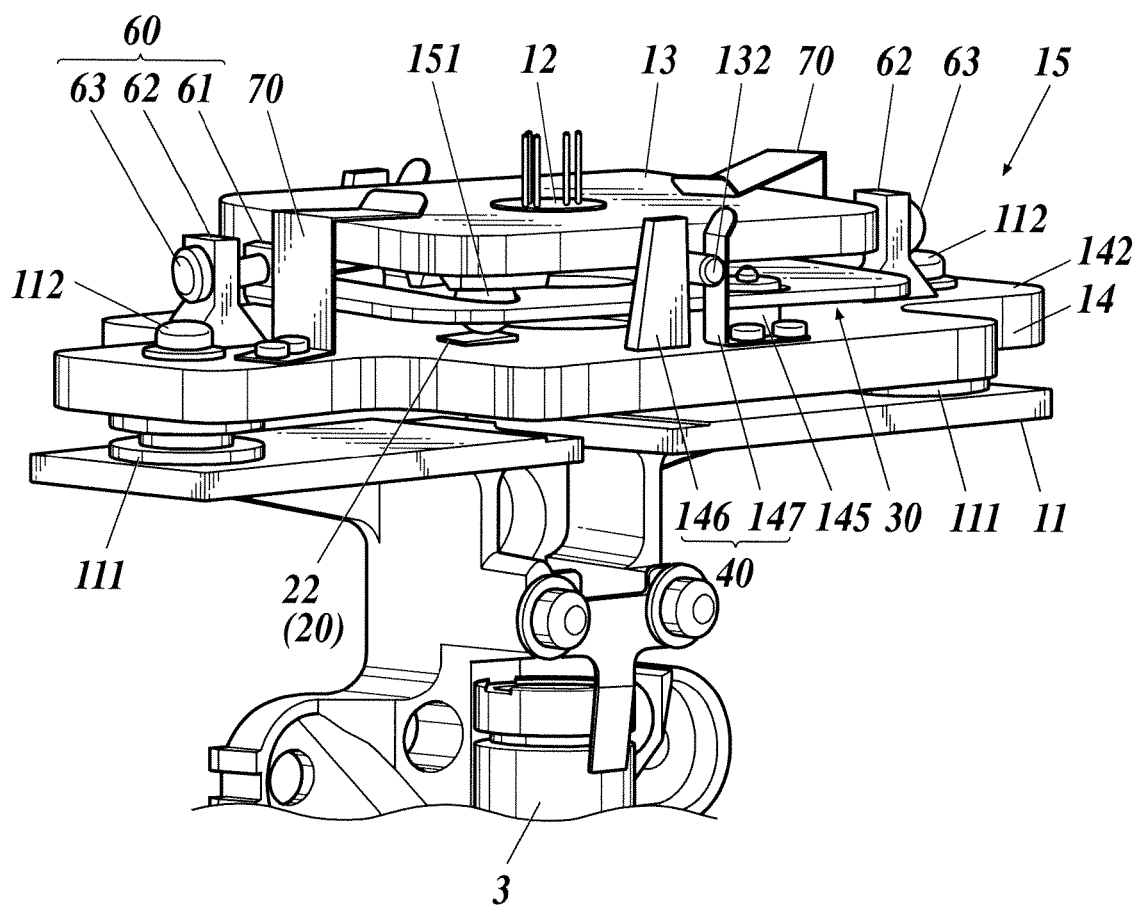
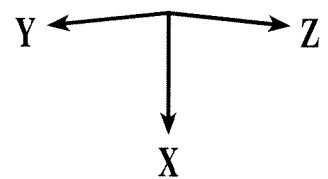

FIG.13
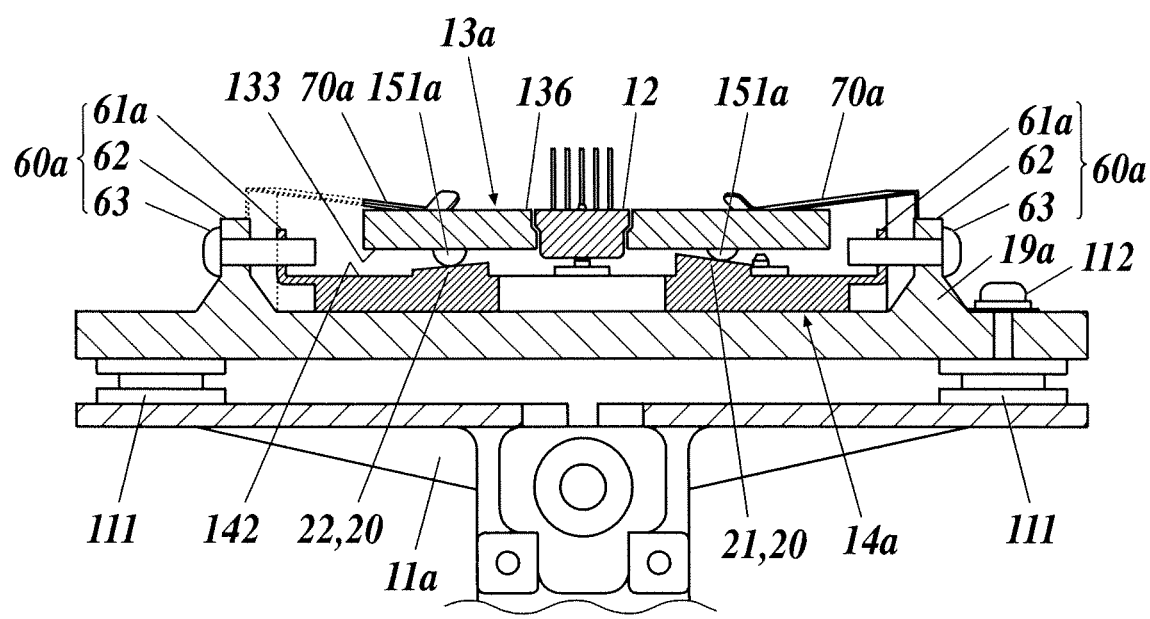
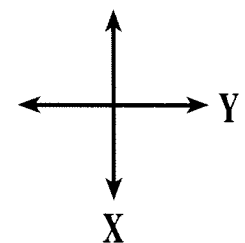

LASER SCANNING OPTICAL DEVICE

CROSS-REFERENCE TO RELATED APPLICATION

The present U.S. patent application claims a priority under the Paris Convention of Japanese patent application No. 2011-100376 filed on Apr. 28, 2011 and Japanese patent application No. 2011-100378 filed on Apr. 28, 2011 which shall be a basis of correction of an incorrect translation, and is incorporated by reference herein.

BACKGROUND OF THE INVENTION

1. Field of the Invention

The present invention relates to a laser scanning optical device.

2. Description of the Related Art

Conventionally, in an image-forming device such as a laser printer and a digital copying machine, a laser scanning optical device is equipped thereto which performs scanning with laser in order to expose a photoreceptor to light.

A laser scanning optical device is provided with a light source which irradiates laser and a holder which holds the light source. The holder is, for example, in an approximate plate shape, and the light source is mounted on one of the surfaces thereof. The attitude of the light source is controlled by tilting the entire holder by applying a force to the holder using, for instance, a screw, in a direction orthogonal to the surface direction of the holder (for example, refer to the Japanese Unexamined Patent Application Publication No. 2000-258710 and the Japanese Unexamined Patent Application Publication No. 2008-112111).

In the aforementioned laser scanning optical device, the attitude of the laser is controlled by directly applying a force to the holder in the direction orthogonal to the surface direction of the holder. However, the force could deform the entire holder and inhibit accuracy of the control of the attitude of the light source.

SUMMARY OF THE INVENTION

The present invention has been accomplished in view of the above-mentioned problems of the prior art, and the object thereof is to prevent deformation of a holder which happens when adjusting an installation attitude of a light source and improve accuracy of attitude control of the light source.

To achieve at least one of the abovementioned objects, a laser scanning optical device, reflecting one aspect of the present invention, includes:

a light source having a plurality of emission points;

a plate-like light source holder which holds the light source in a center of the light source holder;

a base arranged to face the light source holder; and an attitude adjusting part which adjusts an attitude of the light source by adjusting a tilt of the light source holder, and the attitude adjusting part includes an inclined part and an inclination conveying part, and adjusts the tilt of the light source holder with respect to the base by displacing an abutting position of the inclined part corresponding to the inclination conveying part along an inclined surface of the inclined part.

Preferably, in the laser scanning optical device, the plurality of inclined parts are formed on a surface of the base which faces the light source holder or on a surface of the light source holder which faces the base, the plurality of inclination conveying parts are provided to be respectively located between the inclined parts and the light source holder or the base, at least one inclined part among the plurality of inclined parts, configuring a first inclined part, and the remaining inclined parts configuring a second inclined part, are arranged to sandwich an optical axis of the light source, the inclined surface of the first inclined part and the inclined surface of the second inclined part are inclined to become closer to each other with respect to the surfaces on which the inclined parts are provided, as being distanced from the optical axis, and the tilt of the light source holder is adjusted with respect to the base by displacing the abutting position of the respective plurality of inclination conveying parts on the respectively corresponding inclined parts, along the inclined surface.

Preferably, the laser scanning optical device further includes a collimator lens which converts diverging light from the light source into parallel light, and the base holds the light source through the light source holder, the base includes an accommodation recess which accommodates the light source holder slideably along an outer periphery of the light source holder, and a first adjusting member rotatably accommodated in the accommodation recess about an optical axis of the collimator lens, at least one of the inclination conveying parts abutting on the first adjusting member is formed in the light source holder, at least one of the inclined parts which is inclined with respect to a flat surface orthogonal to the optical axis direction is formed on an abutting surface of the first adjusting member on which the inclination conveying part abuts, and the first adjusting member is rotated about the optical axis to change the abutting position of the inclination conveying part on the inclined part, which makes the light source holder oscillate along the inclined part, thus adjusting the attitude of the light source.

BRIEF DESCRIPTION OF THE DRAWINGS

The present invention will be more fully understood by the following detailed description and the accompanying drawings. However, these are not intended to limit the present invention, wherein:

FIG. 2 is a perspective view showing a schematic structure of a laser irradiating part of the first embodiment;

FIG. 6A is a cross-sectional view of a side furthest from an optical axis, FIG. 6B is a cross-sectional view in the middle, and FIG. 6C is a cross-sectional view of a side closest to the optical axis;

FIG. 12A shows a state before the adjustment, FIG. 12B shows a state where the attitude of the light source 12 has been adjusted by rotating the light source holder 13 in a clockwise direction, and FIG. 12C shows a state where the attitude of the light source 12 has been adjusted by rotating the light source holder 13 in an counterclockwise direction;

FIG. 13 is a cross-sectional view showing a modification example of the laser scanning optical device according to the first embodiment;

PREFERRED EMBODIMENTS OF THE PRESENT INVENTION

Preferred embodiments for carrying out the present invention will be explained below using the drawings. However, although various technically-preferred limitations are included in the embodiments described below in order to carry out the present invention, the scope of the present invention shall not be limited to the embodiments below and illustrated examples.

First Embodiment

Figure 1:
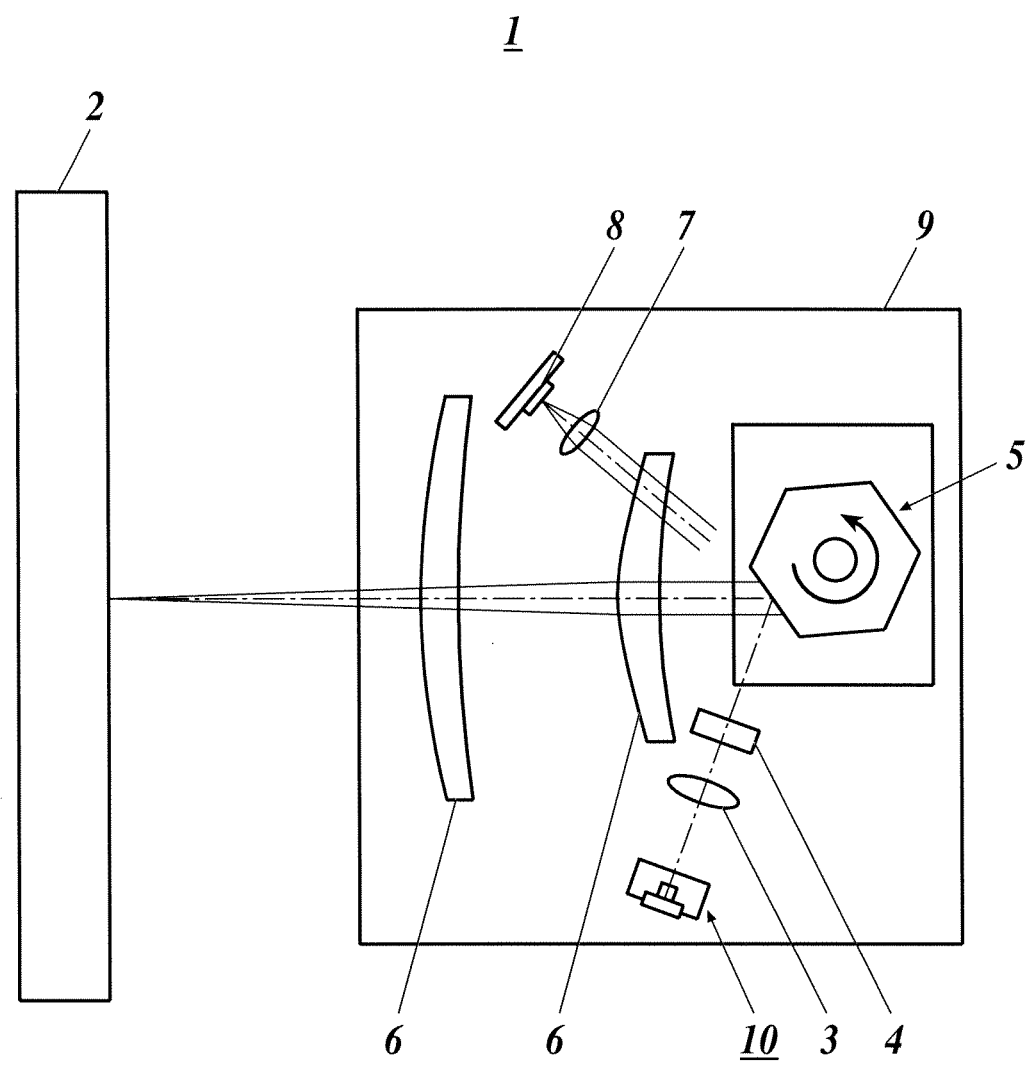
FIG. 1 is a schematic view showing a schematic structure of a laser scanning optical device according to a first embodiment.

FIG. 1 is a schematic view showing a schematic structure of a laser scanning optical device according to this embodiment. As illustrated in FIG. 1, the laser scanning optical device 1 irradiates laser to a photoreceptor 2 to expose the photoreceptor 2 to light. The laser scanning optical device 1 is provided with a laser irradiating part 10 which irradiates laser, a first optical system 3 which converts diverging light generated in the laser irradiating part 10 into parallel light, a second optical system 4 which converts parallel light converted by the first optical system 3 into converging light only in the sub scanning direction, a polariscope 5 which polarizes the converging light converted by the second optical system 4, a third optical system 6 which condenses polarized laser onto the photoreceptor 2, a fourth optical system 7 for timing a starting position, and a sensor 8, which are all held by an optical housing 9.

Figure 3:
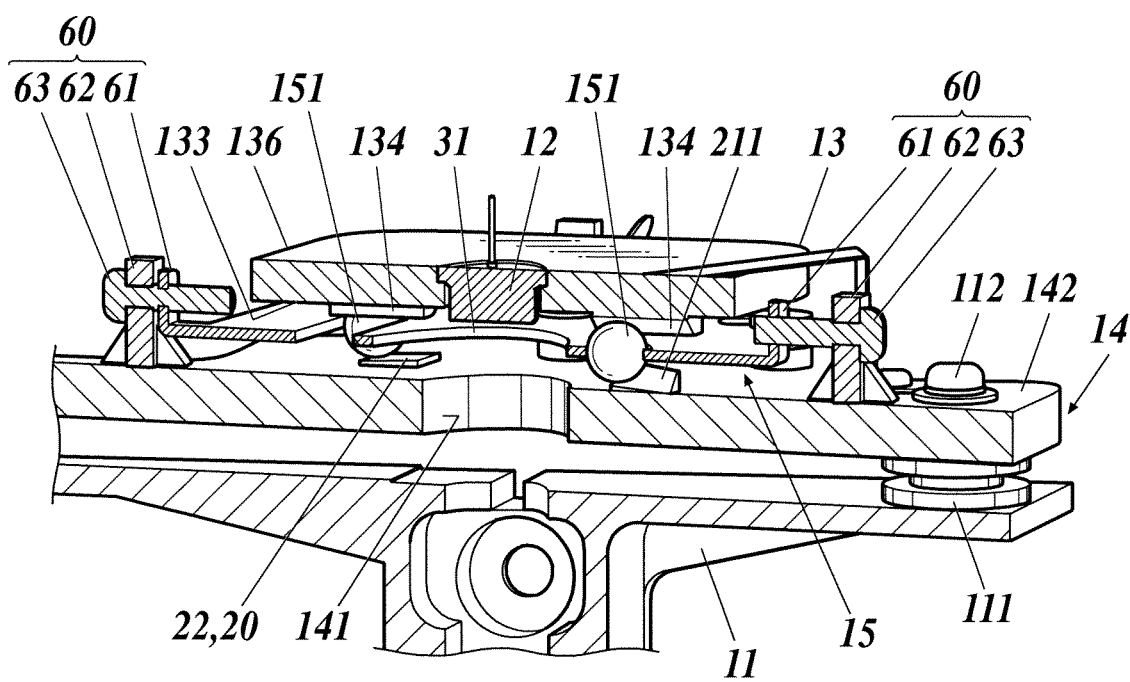
FIG. 3 is a cross-sectional view taken along the Y-X plane of the laser irradiating part of FIG. 2.
Figure 4:
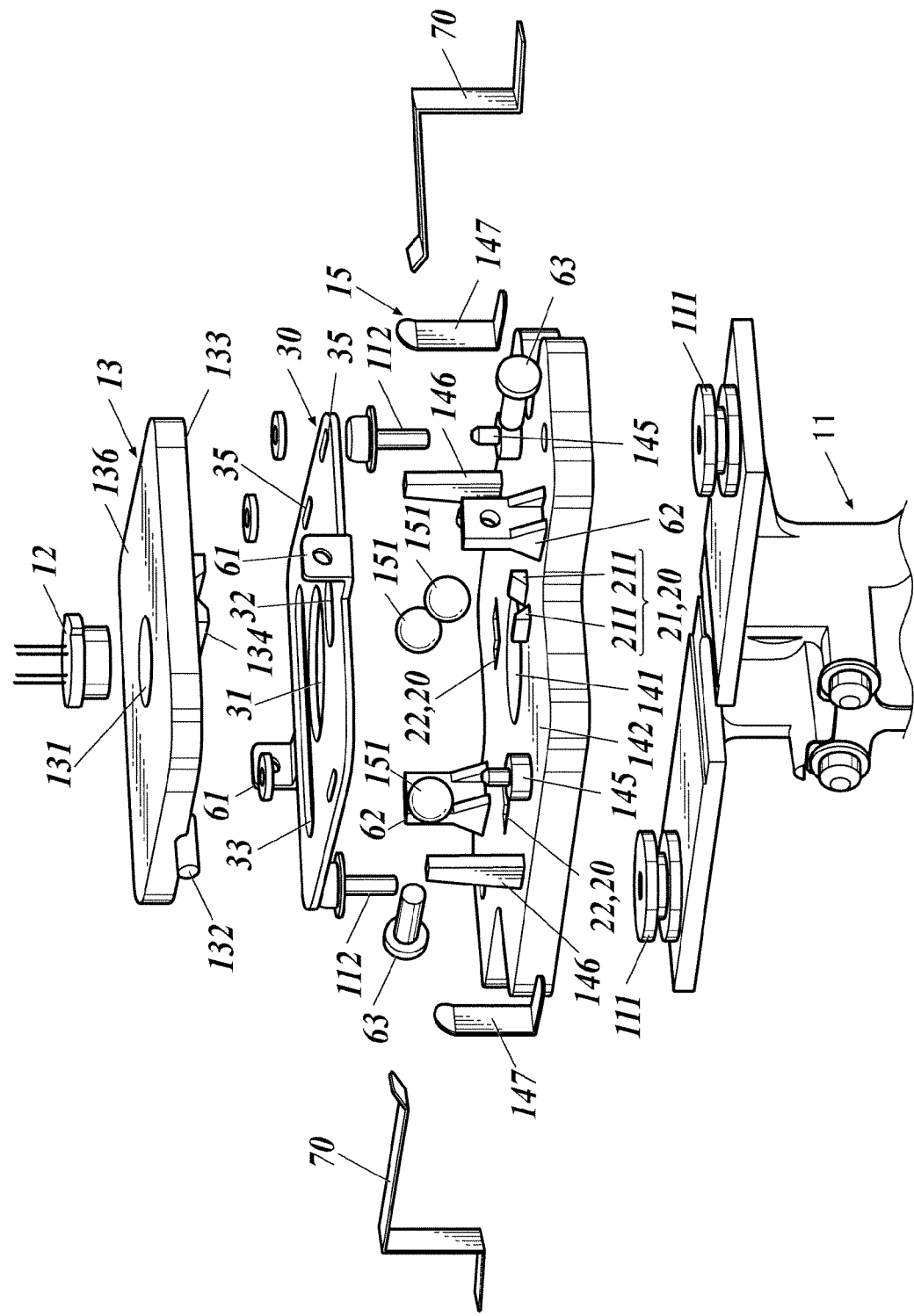
FIG. 4 is an exploded perspective view of the laser irradiating part of FIG. 2.

FIG. 2 is a perspective view showing a schematic structure of the laser irradiating part 10, FIG. 3 is a cross-sectional view of the laser irradiating part 10 taken along the Y-X plane, and FIG. 4 is an exploded perspective view of the laser irradiating part 10. As shown in FIGS. 2 to 4, the laser irradiating part 10 includes a seating 11, a light source 12, a light source holder 13, and a base 14.

The seating 11 supports a collimator lens which serves as the first optical system 3, the light source 12, the light source holder 13, the base 14, and an attitude adjusting part 15. The seating 11 supports the first optical system 3 in an attitude-adjustable manner along an optical axis direction (the X direction in FIG. 2). Laser passes from the first optical system 3 through to the light source 12.

Also, on the opposite side of the seating 11 to the first optical system 3, flanges 111 are provided, and the base 14 is fixed by screws 112 along the Y-Z plane through the flanges 111.

In the base 14, a passage hole 141 is formed in the center in order to arrow laser from the light source 12 to pass through to the first optical system 3. The attitude adjusting part 15 for adjusting the attitude of the light source 12 is provided on the base 14. The attitude adjusting part 15 will be described later.

The light source holder 13 is formed into an approximate plate shape, and holds the light source 12 in the center thereof. The light source holder 13 and the base 14 are arranged to face each other at a given interval.

Figure 5:
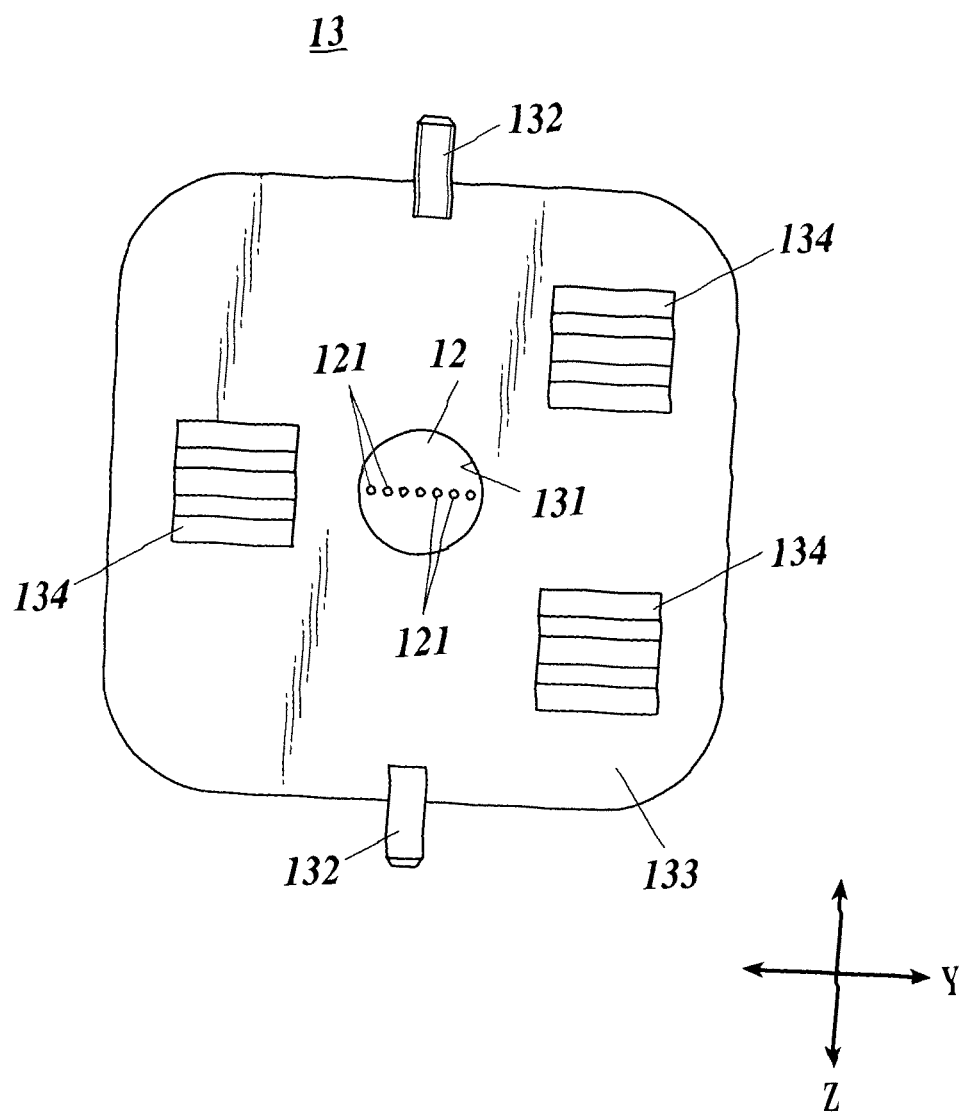
FIG. 5 is a front view showing a schematic structure of a light source holder of the first embodiment.

FIG. 5 is a front view showing a schematic structure of the light source holder 13. As illustrated in FIG. 5, in the center of the light source holder 13, a fitting hole 131 is provided to which the light source 12 is fitted. A plurality of light emission points 121 of the light source 12 fitted into the fitting hole 131 are arranged along the Y direction. Further, in the light source holder 13, a pair of shafts 132 which face each other extends outwardly along the Z direction. Furthermore, on an opposite surface 133 of the light source holder 13 which faces the base 14, three positioning parts 134 are provided which position three spherical objects 151 of the attitude adjusting part 15, respectively, and limits movements thereof in the Z direction.

The attitude adjusting part 15 adjusts the attitude of the light source 12 by adjusting the tilt of the light source holder 13 with respect to the base 14. As shown in FIGS. 2 to 4, the attitude adjusting part 15 is provided with a plurality of inclined parts 20, spherical objects 151 respectively corresponding to the inclined parts 20, a sliding member 30, holder position controlling parts 40, and pressing members 70.

The plurality of inclined parts 20 are formed on an opposite surface 142 of the base 14 which faces the light source holder 13. Among the plurality of inclined parts 20, at least one first inclined part 21, and the remaining second inclined parts 22 are arranged so as to sandwich the optical axis of the light source 12. The example which will be explained in this embodiment will be a case where one first inclined part 21 and two second inclined parts 22 are provided. The first inclined part 21 is located at a position that is off for a given distance from the optical axis in the Y direction, and two inclined parts 22 are located at positions which are off for a given distance from the optical axis in the Y direction on the opposite side of the first inclined part 21. Further, the two inclined parts 22 are arranged at a given distance from each other across the optical axis in the Z direction.

Figure 6:
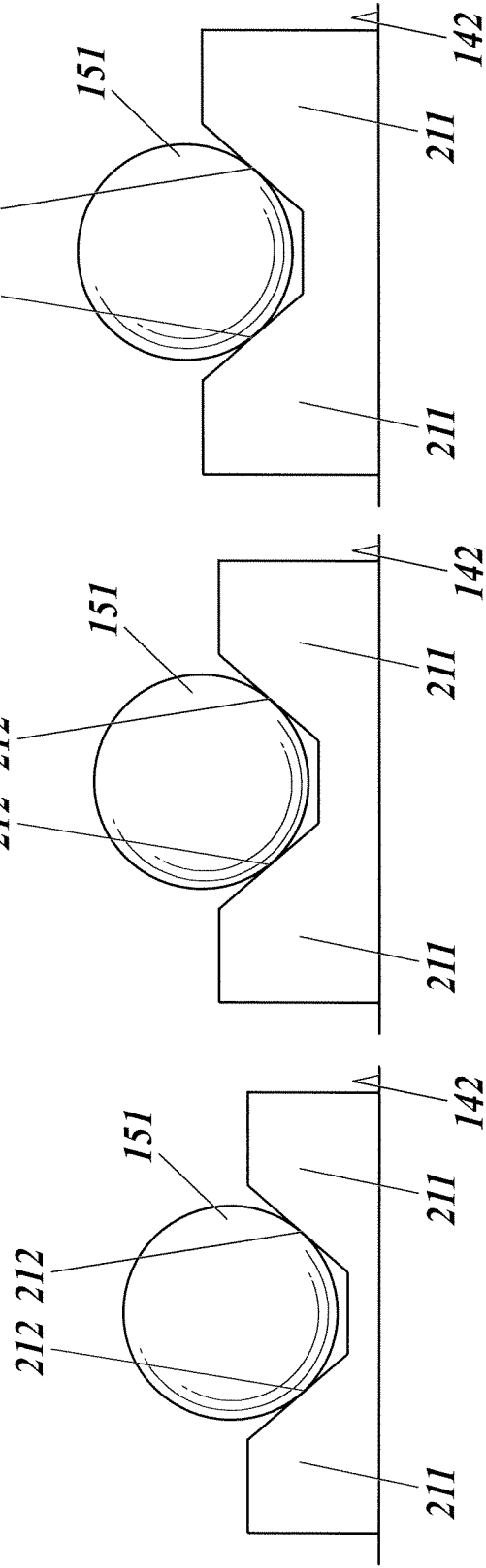
FIG. 6A to 6C are explanatory views showing a schematic shape of a pair of inclined surfaces according to the first embodiment, where

The first inclined part 21 is formed of a pair of projections 211, and the opposing surfaces of the pair of projections 211 are inclined surfaces 212. FIGS. 6A to 6C are explanatory views showing schematic shapes of the pair of inclined surfaces 212, where FIG. 6A is a cross-sectional view on the side farthest from the optical axis, FIG. 6B is a cross-sectional view in the middle, and FIG. 6C is a cross-sectional view of a side closest to the optical axis. As illustrated in FIGS. 6A to 6C, the relative positions of the pair of inclined surfaces 212 are not very different in the Z direction. In addition, the pair of inclined surfaces 212 gets distanced more from the opposite surface 142 as being closer to the optical axis.

Also, as shown in FIGS. 2 to 4, the inclined surfaces 221 of the second inclined parts 22 become closer to the opposite surface 142 as being distanced from the optical axis.

Figure 7:
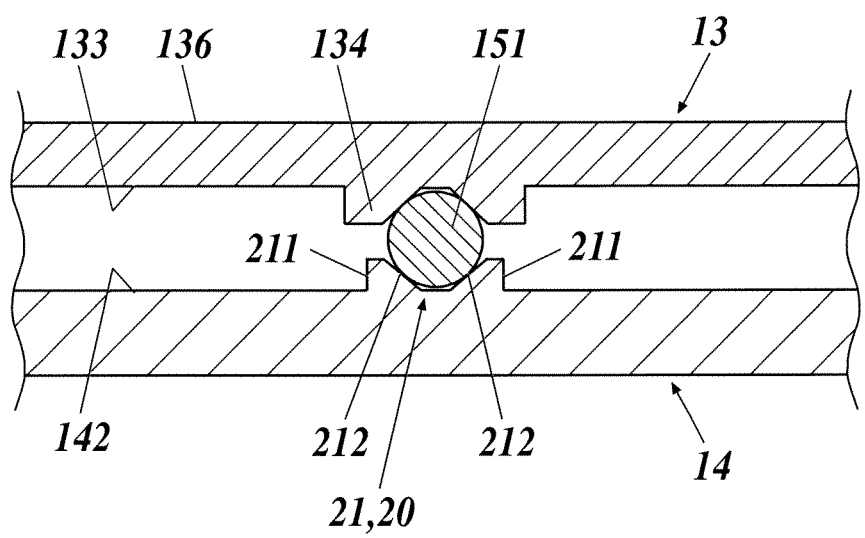
FIG. 7 is a cross-sectional view showing a spherical object located between a first inclined part and a positioning part according to the first embodiment.

The first inclined part 21 and the second inclined parts 22 are facing the positioning parts 134 of the light source holder 13, respectively, and there are spherical objects 151 therebetween. FIG. 7 is a cross-sectional view showing the spherical object 151 placed between the first inclined part 21 and the positioning part 134. The spherical object 151 is sandwiched between the respective inclined surfaces 212 of the first inclined part 21, and also sandwiched by the positioning part 134, which limits a movement of the spherical object 151 in the Z direction.

Figure 8:
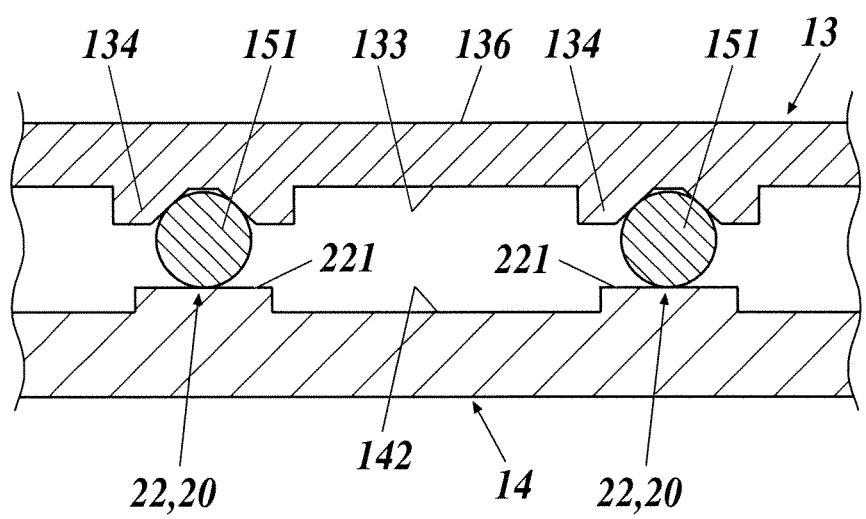
FIG. 8 is a cross-sectional view showing spherical objects located between second inclined parts and positioning parts according to the first embodiment.

Meanwhile, FIG. 8 is a cross-sectional view showing the spherical objects 151 located between the second inclined parts 22 and the positioning parts 134. The spherical objects 151 are sandwiched between the inclined surfaces 221 of the second inclined parts 22 and the positioning parts 134, while the movement thereof in the Z direction is limited by the positioning parts 134. This way, the three spherical objects 151 serve as inclination conveying parts of this invention, respectively located between the inclined parts 20 and the light source holder 13.

Figure 9:
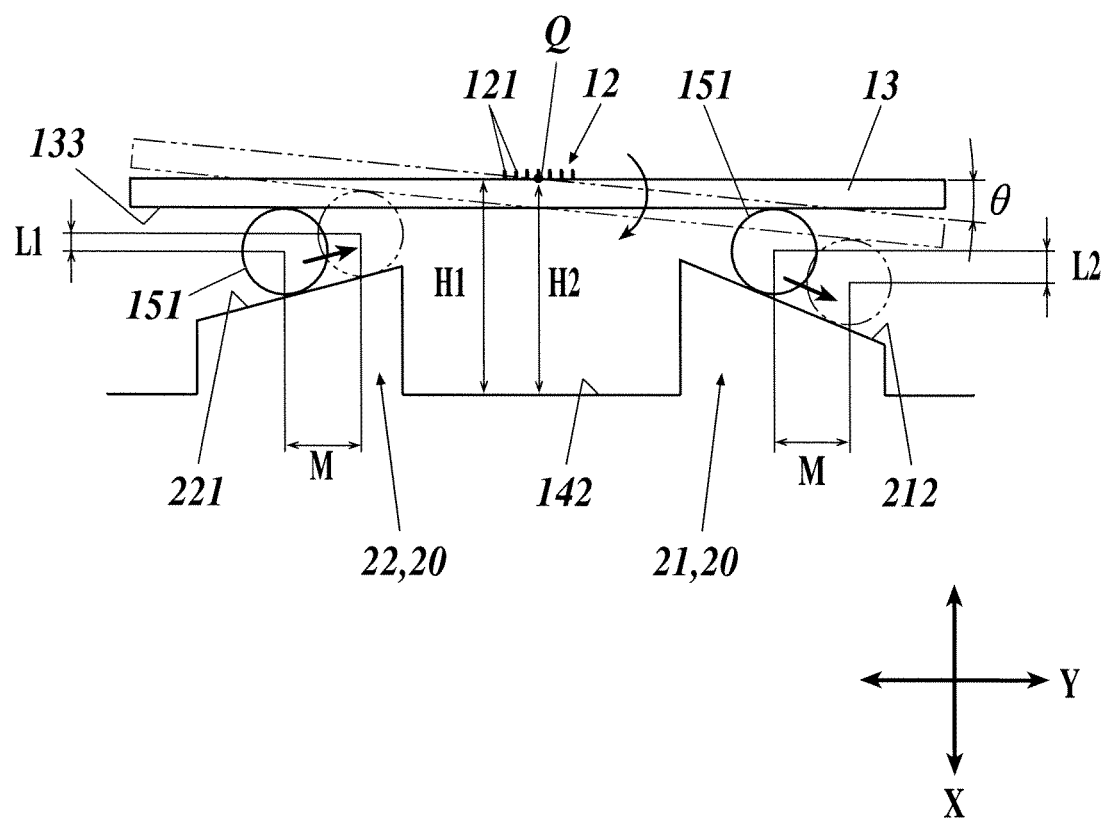
FIG. 9 is a schematic view schematically showing a positional relation among the inclined parts, the spherical objects, and the light source holder.

FIG. 9 is a schematic view which schematically shows a positional relation among the inclined parts 20, the spherical objects 151, and the light source holder 13. For example, as illustrated in FIG. 9, when adjusting the attitude of the light source 12 from a state where the opposite surface 133 of the light source holder 13 is parallel to the opposite surface 142 of the base 14, the light source holder 13 oscillates by displacing the plurality of spherical objects 151 along the inclined surfaces 212 and 221, thus adjusting the attitude of the light source 12. By displacing the abutting positions of the plurality of spherical objects 151 on the inclined parts 20 corresponding to the respective spherical objects 151 along the inclined surfaces 212 and 221, the tilt of the light source holder 13 can be adjusted with respect to the base 14.

Here, the axis of rotation Q during oscillation of the light source holder 13 exists in the Z direction. This means that the light emission points 121 are arranged along the Y direction which is orthogonal to the axis of rotation Q.

Figure 10:
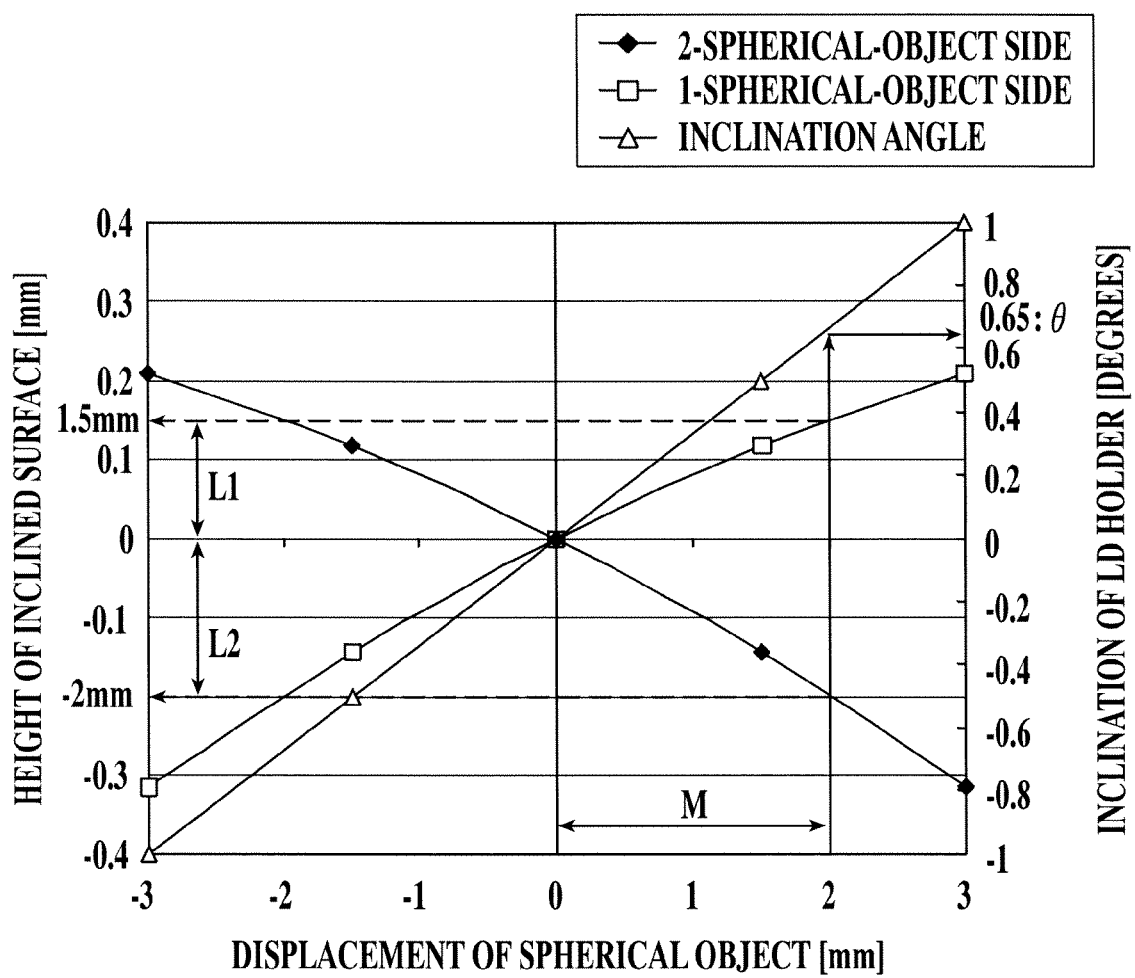
FIG. 10 is a graph showing an example of a relation among a rotation angle of the light source holder, and heights of the inclined surfaces of the inclined parts according to the first embodiment.

Further, FIG. 10 is a graph showing an example of a relation between the angle of rotation θ of the light source holder 13 and the heights of the inclined surfaces of the inclined parts 20. This is an example which is set so that the light source holder 13 changes linearly with respect to the amount of displacement of the spherical object 151, and the heights of the inclined parts 20 are appropriately set with respect to the abutting positions thereon. In this case, as the spherical object 151 is moved for M (2 mm), the angle of rotation θ of the light source holder 13 becomes 0.65 degrees. At this time, the inclinations of the inclined surfaces 212 and 221 are decided so that the heights L1 and L2 of the inclined parts 20 become 1.5 mm and −2 mm, respectively. By setting the heights of the inclined parts 20 appropriately, the interval H1 from the opposite surface 142 of the base 14 to the light emission points 121 and the interval H2 from the opposite surface 142 to the axis of rotation Q can be equalized to each other.

Figure 11:
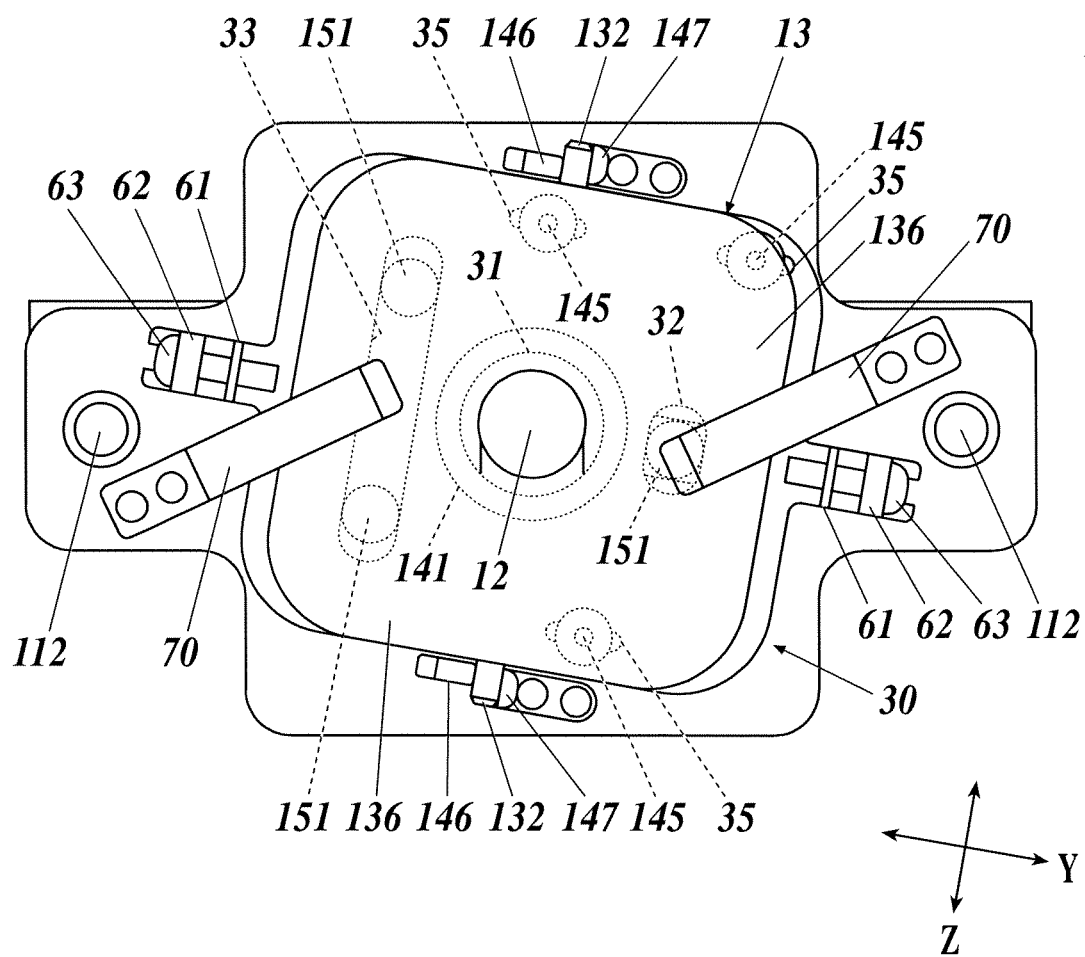
FIG. 11 is a back view of a schematic structure of a sliding member according to the first embodiment, seen from the light source side.

The sliding member 30 slides the plurality of spherical objects 151 so that the abutting positions of the spherical objects 151 on the inclined parts 20 corresponding to the spherical objects 151 are displaced along the inclined surfaces 212 and 221. FIG. 11 is a back view of a schematic structure of the sliding member 30 seen from the side of the light source 12. As shown in FIG. 11 and FIGS. 2 to 4, the sliding member 30 is formed into a plate shape, and the passage hole 31 is made in the center thereof through which laser from the light source 12 passes. Also, in the sliding member 30, a first long hole 32 for holding the spherical object 151 which corresponds to the first inclined part 21, and a second long hole 33 for holding the two spherical objects 151 which correspond to the second inclined parts 22 are formed. The first long hole 32 extends in the Z direction and has room equivalent to a play when holding the spherical object 151. Further, the second long hole 33 extends in the Z direction and holds the two spherical objects 151 alone. As described above, the respective spherical objects 151 are prevented from moving in the Z direction by the positioning parts 134, so the spherical objects 151 are prevented from moving along the long holes 32 and 33 in the Z direction.

Also, in the laser scanning optical device 1, a slide mechanism 60 is provided which slides the sliding member 30 with respect to the opposite surface 142 of the base 14. The slide mechanism 60 is provided with a pair of bent pieces 61 bent outwardly from both end sides of the slide member 30 in the Y direction, a pair of base pieces 62 projecting from the opposite surface 142 of the base 14 so as to face the bent pieces 61, and sliding screws 63 which can freely advance and retreat with respect to the base pieces 62, respectively. The end portions of the sliding screws 63 are screwed to the bent pieces 61 as well. The sliding screws 63 advance and retrieve along the Y direction and the sliding member 30 slides in the Y direction by letting the sliding screws 63 advance and retreat with respect to the base pieces 62. Thus, the spherical objects 151 also move along the Y direction, making the abutting positions displaced along the inclined surfaces 212 and 221.

Further, a plurality of guide holes 35 are formed in the sliding member 30 along the Y direction. These guide holes 35 are engaged with the projections 145 projecting from the opposite surface 142 of the base 14. Since the projections 145 are engaged with the guide holes 35 when the sliding member 30 slides, stable sliding of the sliding member 30 can be ensured.

The holder position controlling parts 40 control a movement of the light source holder 13 with respect to the direction of movement (Y direction) when displacing the abutting positions. As illustrated in FIGS. 2 and 4, in each of the holder position controlling parts 40, a fixed piece 146 standing from the opposite surface 142 of the base 14 and a plate spring 147 standing from the opposite surface 143 to face the fixed piece 146 are provided, corresponding to each of the pair of shafts 132 of the light source holder 13. The fixed piece 146 and the plate spring 147 sandwich the shaft 132 in the Y direction, which enables the light source holder 13 to oscillate about the shaft 132 which serves as the axis of rotation Q when displacing the abutting positions. At this time, elasticity of the plate springs 147 enables the light source holder 13 to oscillate smoothly. Also, each of the shafts 132 is sandwiched by the fixed piece 146 and the plate spring 147 in the Y direction during oscillation, which prevents the light source holder 13 from moving in the Y direction.

Furthermore, the laser scanning optical device 1 is provided with the pair of pressing members 70 which press the light source holder 13 to the base 14. As depicted in FIGS. 2 and 11, the pressing members 70 are plate springs, and the base end portions thereof are fixed to the opposite surface 142 of the base 14. The end portions of the pressing members 70 press an exposure surface 136 of the light source holder 13 on the opposite side of the opposite surface 133. Here, of the pair of the pressing members 70, one of the pressing members 70 presses a point which faces the first inclined part 21. Meanwhile, the other pressing member 70 presses a position facing a mid point between the pair of second inclined parts 22. Hence, misalignment of the light source holder 13 can be effectively prevented.

Next, operations according to this embodiment will be explained.

Figure 12A:
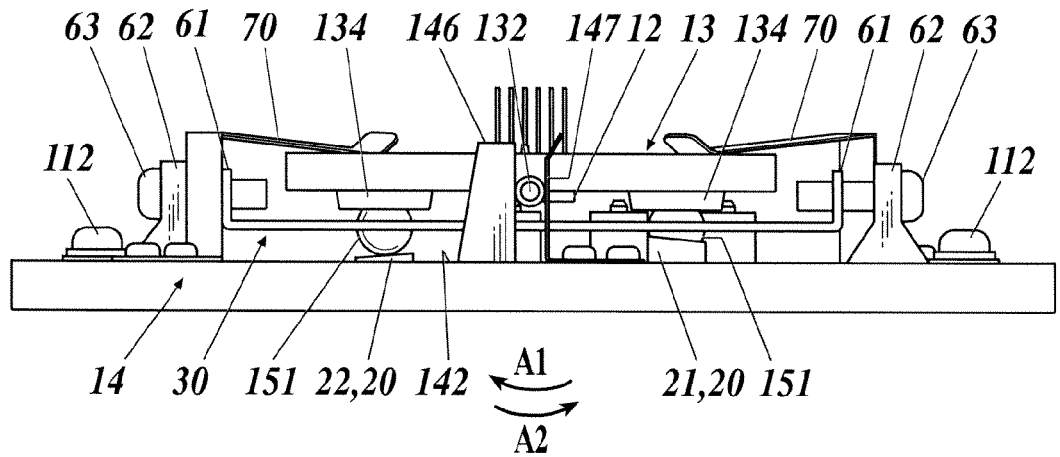
FIGS. 12A to 12C are explanatory views showing the states before and after the light source attitude is adjusted according to the first embodiment, where
Figure 12B:
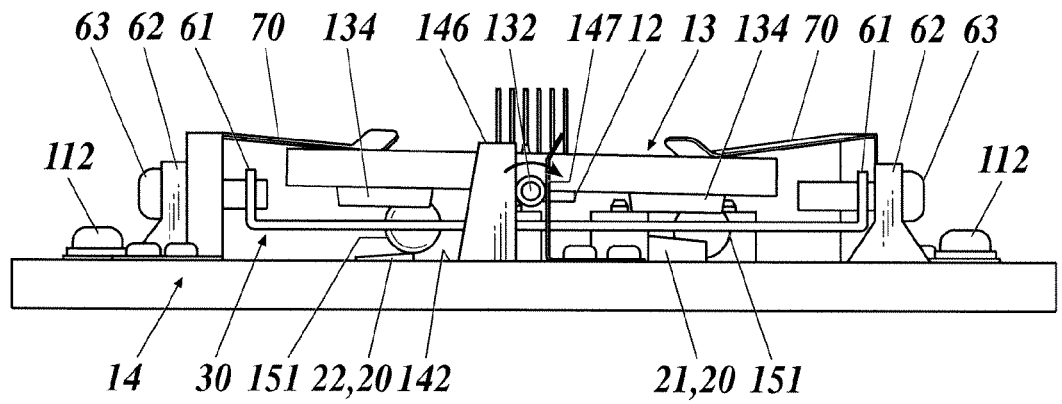
Figure 12C:
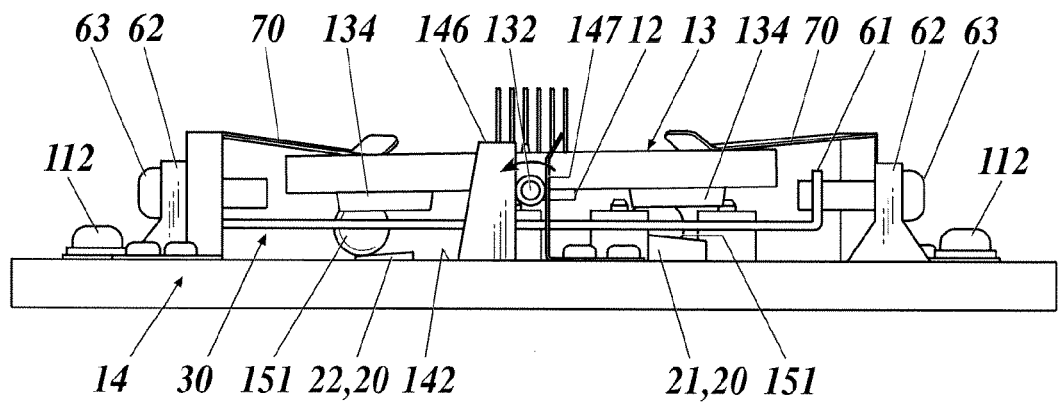

FIGS. 12A to 12C are explanatory views showing the states before and after the attitude of the light source 12 is adjusted, where FIG. 12A shows a state before the adjustment, FIG. 12B shows a state where the attitude of the light source 12 has been adjusted by rotating the light source holder 13 in a clockwise direction, and FIG. 12C shows a state where the attitude of the light source 12 has been adjusted by rotating the light source holder 13 in an counterclockwise direction.

First of all, in the state shown in FIG. 12A, the attitude of the light source 12 is adjusted so that the optical axis is orthogonal to the opposite surface 142 of the base 14. Then, when tilting the optical axis to the left with respect to the opposite surface 142 (the arrow A1), the sliding screws 63 of the slide mechanism 60 are adjusted, sliding the sliding member 30 to the right. This makes the spherical objects 151 slide to the right as well. Here, the spherical object 151 on the inclined surfaces 212 of the first inclined part 21, in other words, the spherical object 151 on the right side in the drawing descends along the inclined surfaces 212. Meanwhile, the spherical object 151 on the inclined surfaces 221 of the second inclined parts 22, in other words, the spherical object 151 on the left side in the drawing ascends along the inclined surfaces 221. Following these moves of the spherical objects 151, the light source holder 13 rotates in the clockwise direction about the axis of rotation Q, thus adjusting the light source 12 to a desired attitude (see FIG. 12B)

On the other hand, when tilting the optical axis to the right with respect to the opposite surface 142 (the arrow A2), the sliding screws 63 of the slide mechanism 60 are adjusted, sliding the sliding member 30 to the left. This makes the spherical objects 151 slide to the left as well. Here, the spherical object 151 on the inclined surfaces 212 of the first inclined part 21, in other words, the spherical object 151 on the right side in the drawing ascends along the inclined surfaces 212. Meanwhile, the spherical object 151 on the inclined surfaces 221 of the second inclined parts 22, in other words, the spherical object 151 on the left side in the drawing descends along the inclined surfaces 221. Following these moves of the spherical objects 151, the light source holder 13 rotates in the counterclockwise direction about the axis of rotation Q, thus adjusting the light source 12 to a desired attitude (see FIG. 12C).

As described above, according to this embodiment, by displacing the abutting positions of the plurality of spherical objects 151 on the inclined parts 20 which correspond to the spherical objects 151, respectively, along the inclined surfaces 212 and 221, the tilt of the light source holder 13 is adjusted with respect to the base 14, thus adjusting the attitude of the light source 12. Therefore, the attitude of the light source 12 can be controlled without applying a force directly to a light source folder in the orthogonal direction to the surface direction of the light source holder to control the attitude of a light source like the prior art. This enables to prevent deformation of the light source holder 13 which occurs while adjusting the installation attitude of the light source 12 and improve accuracy of the attitude control of the light source 12.

Also, since the position of the light source holder 13 is controlled with respect to the movement direction when the holder position controlling parts 40 displace the abutting positions, the attitude of the light source 12 can be adjusted without displacing the position of the light source holder 13.

Further, since the plurality of spherical objects 151, as well as the sliding member 30 for sliding the plurality of spherical objects 151 are provided so that the abutting positions of the spherical objects 151 onto the corresponding inclined parts 20 are displaced along the inclined surfaces 212 and 221, the abutting positions can be displace by sliding the spherical objects 151 at one time. Also, as the spherical objects 151 slide with respect to the inclined surfaces 212 and 221, the spherical objects 151 themselves are ascended/descended by the inclined surfaces 212 and 221, thus the amount of ascending/descending also changes in conjunction with the amount of sliding of the spherical objects 151. For instance, when a change in the amount of ascending/descending is small with respect to a change in the amount of sliding, in other words, when the inclination angles of the inclined surfaces 212 and 221 are not very steep, the amount of ascending/descending of the spherical objects 151 is small even if the sliding member 30 is greatly moved. This means that fine adjustment of the amount of rotation of the light source holder 13 is also enabled by largely moving the sliding member 30.

Moreover, since the sliding mechanism 60 slide the plurality of spherical objects 151 by sliding the sliding member 30 with respect to the opposite surface 142 of the base 14, better operability is obtained than directly sliding the sliding member 30.

Furthermore, since the light source holder 13 is pressed to the base 14 by the pressing members 70, the positional relation between the light source holder 13 and the base 14 can be prevented from largely misaligned.

Yet further, since the plurality of light emission points 121 are arranged along the direction orthogonal to the axis of rotation Q when the light source holder 13 oscillates, the attitude of the light source 12 can be adjusted without tilting the arrangement of the plurality of the light emission points 121.

Furthermore, since the interval H1 between the plurality of light emission points 121 and the base 14 and the interval H2 between the axis of rotation Q and the base 14 are the same, the amount of rotation of the light source holder 13 and the amount of displacement of the light emission points 121 during attitude adjustment can be equalized. Thus, more accurate attitude control becomes possible.

Note that the present invention is not limited to the aforementioned embodiment and may be changed as appropriate.

For instance, although the case explained in the above embodiment as an example was that the inclined parts 20 are formed on the opposite surface 142 of the base 14 which faces the light source holder 13, the inclined parts 20 may be formed on the opposite surface 133 of the light source holder 13 which faces the base 14. In this case, the spherical objects 151 are located between the inclined parts 20 and the base 14.

Also, in the aforementioned embodiment, a case was explained as an example where the spherical objects 151 which serve as the inclination conveying parts are separated from the light source holder 13, but the inclination conveying parts may be formed integrally with the light source holder 13. A specific explanation will be provided below based on FIG. 13, but the same reference numerals are given without adding explanations for those configurations that are the same as the above-mentioned embodiment.

In a laser irradiating part 10A of a laser scanning optical device shown in FIG. 13, inclination conveying members 151a are integrally provided in a light source holder 13a, and the sliding member 30 is omitted. There is more than one inclination conveying member 151a which projects from an opposite surface 133 of the light source holder 13a, and the projecting surfaces thereof are convexly curved.

On a seating 11a, a support stand 19a is fixed which slideably holds a base 14a. A pair of pressing members 70a presses the light source holder 13a to the seating 11a, and the base ends thereof are fixed to the seating 11a. The end portions of the pressing members 70a press an exposure surface 136 of the light source holder 13a.

A sliding mechanism 60a includes a pair of bent pieces 60a bent outwardly from both end portions of the base 14a in the Y direction, a pair of base pieces 62 projecting from an opposite surface 142 of the base 14a so as to face the bent pieces 61a, and sliding screws 63 which can freely advance and retrieve with respect to the base pieces 62, respectively. The end portions of the sliding screws 63 are also screwed to the bent pieces 61a. The sliding screws 63 advances/retrieves along the Y direction, and the base 14a slides in the Y direction by letting the sliding screws 63 advance and retreat with respect to the base pieces 62. Thus, the inclination conveying members 151a are ascended/descended by inclined surfaces 212 and 221, making the light source holder 13a rotate about an axis of rotation Q.

Second Embodiment

Figure 14:
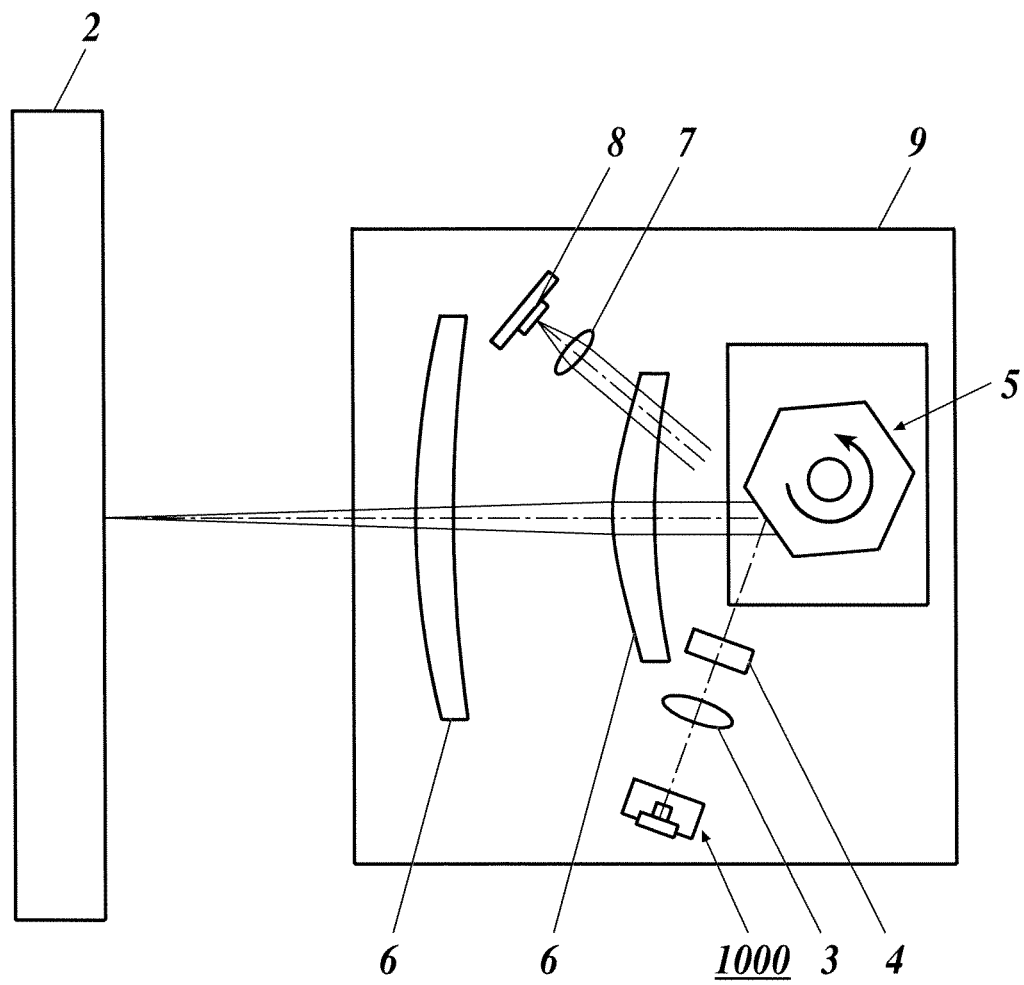
FIG. 14 is a schematic view showing a schematic structure of a laser scanning optical device according to a second embodiment.

FIG. 14 is a schematic view showing a schematic structure of a laser scanning optical device according to this embodiment. As illustrated in FIG. 14, the laser scanning optical device 1A irradiates laser to a photoreceptor 2 to expose the photoreceptor 2 to light. The laser scanning optical device 1A is provided with a laser irradiating part 1000 which irradiates laser, a first optical system 3 which converts diverging light generated in the laser irradiating part 1000 into parallel light, a second optical system 4 which converts parallel light converted by the first optical system 3 into converging light only in the vertical scanning direction, a polariscope 5 which polarizes the converging light converted by the second optical system 4, a third optical system 6 which condenses polarized laser onto the photoreceptor 2, a fourth optical system 7 for timing a starting position, and a sensor 8, which are all held by an optical housing 9.

Figure 15:
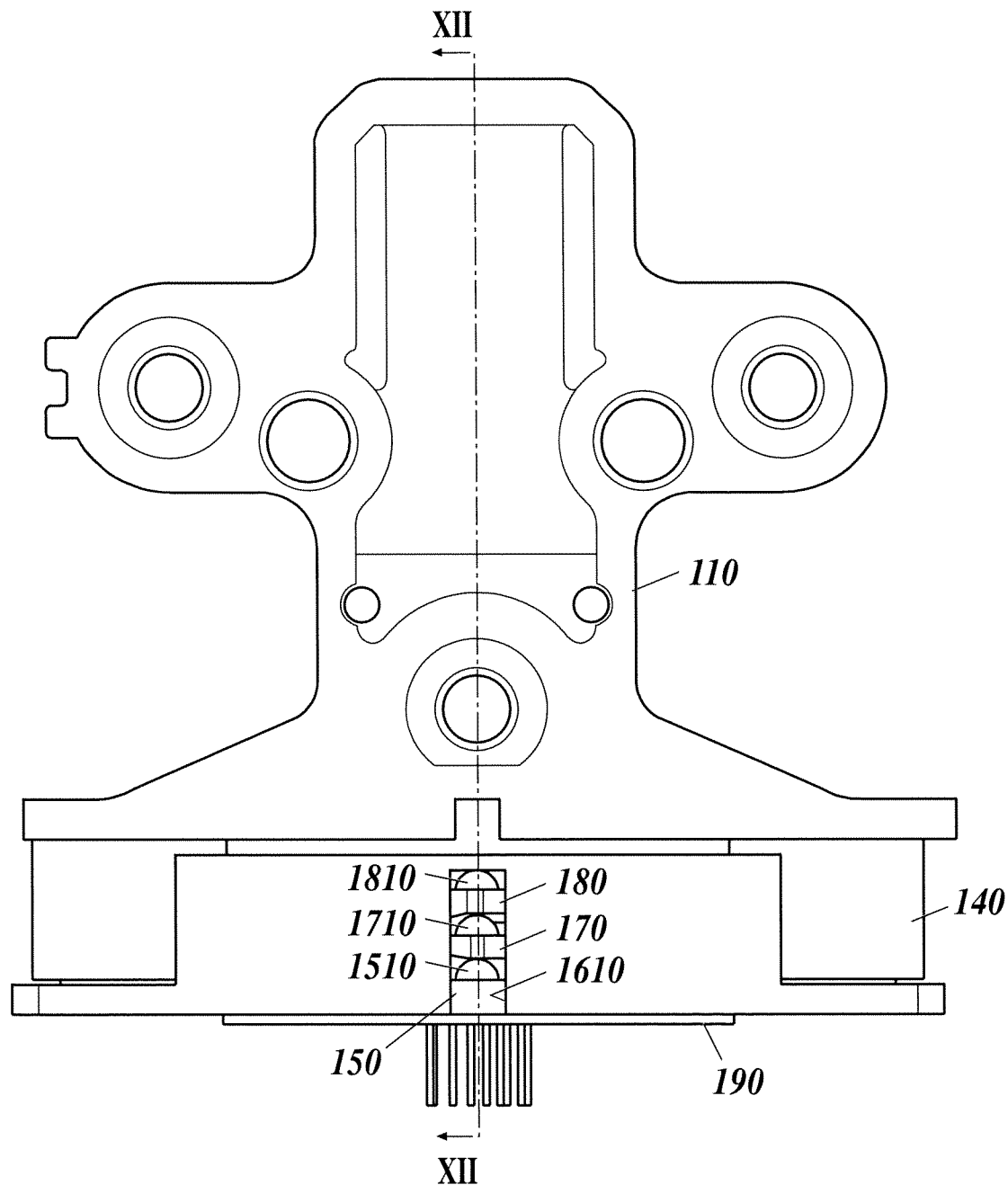
FIG. 15 is a front view showing a schematic structure of a laser irradiating part according to the second embodiment.
Figure 16:
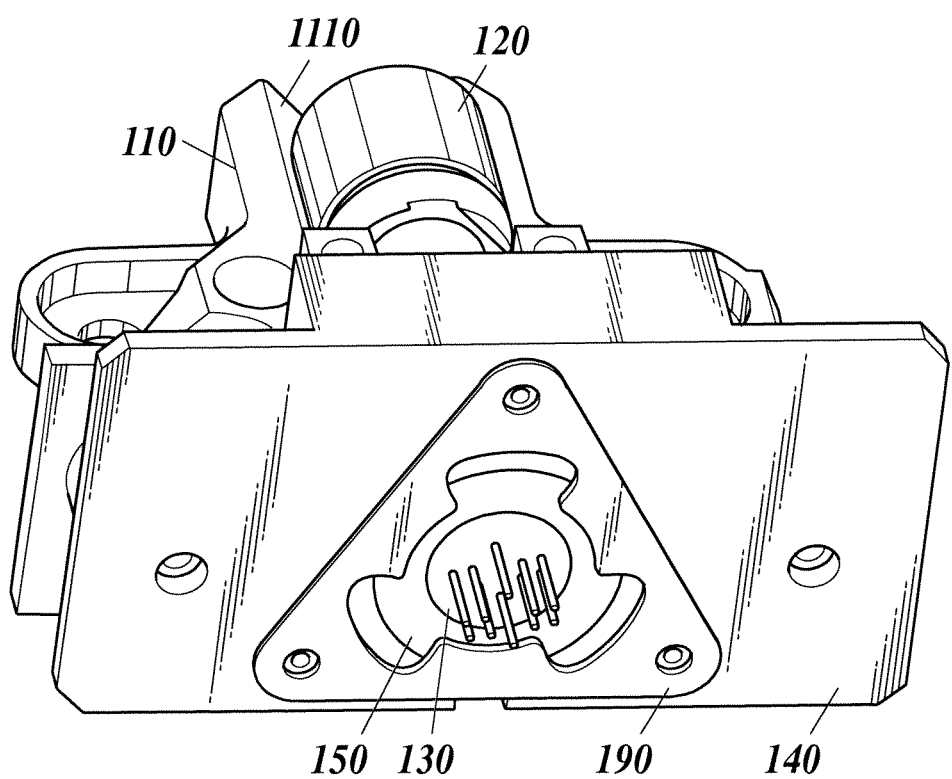
FIG. 16 is a perspective view of the laser irradiating part of FIG. 15.
Figure 17:
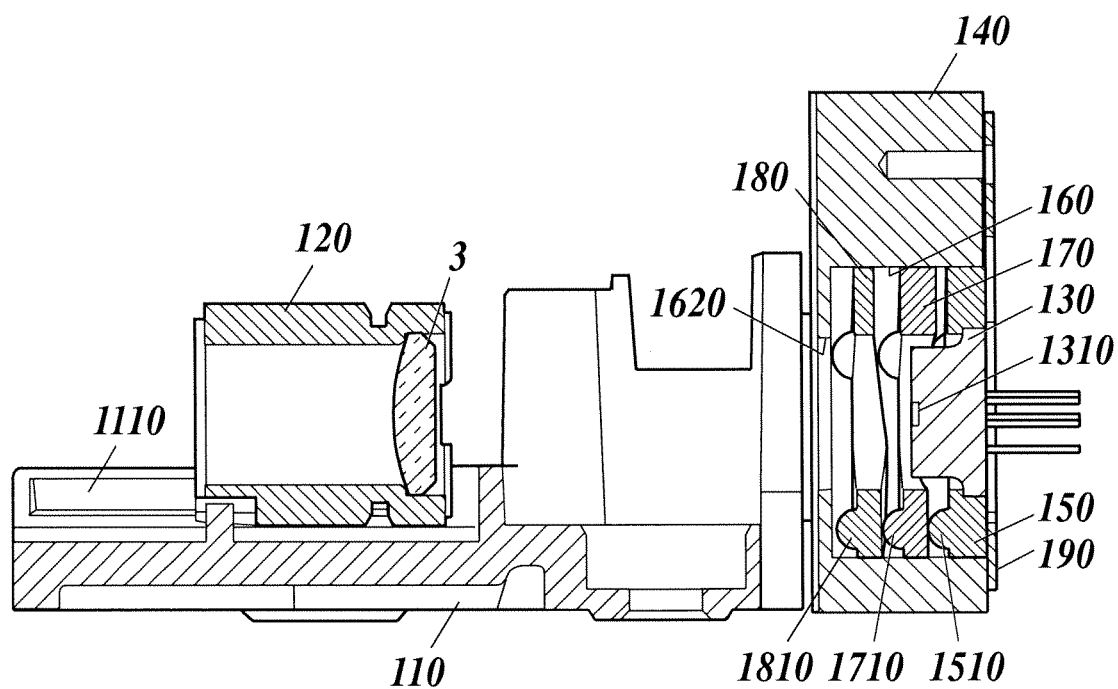
FIG. 17 is a cross-sectional view taken along the section line XII-XII in FIG. 15.
Figure 18:
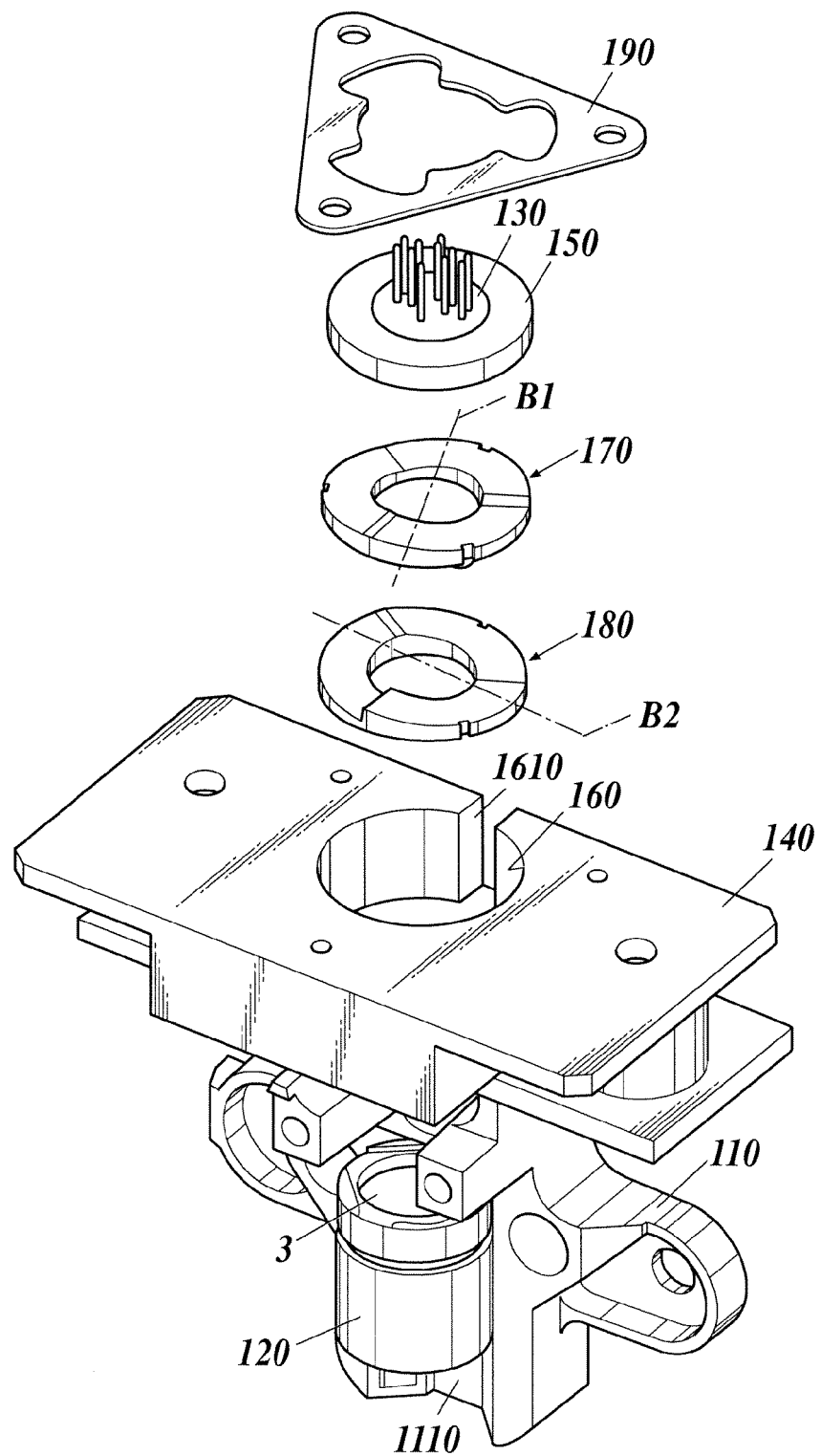
FIG. 18 is an exploded perspective view of the laser irradiating part of FIG. 15.

FIG. 15 is a front view showing a schematic structure of the laser irradiating part 1000, FIG. 16 is a perspective view of the laser irradiating part 1000, FIG. 17 is a cross-sectional view taken along the section line XII-XII in FIG. 15, and FIG. 18 is an exploded perspective view of the laser irradiating part 1000. As illustrated in FIGS. 15 to 18, the laser irradiating part 1000 includes a main body 110, a lens holder 120 which holds a collimator lens which serves as the first optical system 3, a light source 130, and a base 140 which holds the light source 130.

The main body 110 holds the lens holder 120 and the base 140 such that the first optical system 3 and the light source 130 face each other. In the main body 110, a guide rail 1110 is formed in order to slide the lens holder 120 along an optical axis.

The lens holder 120 is in a tubular shape and accommodates the first optical system 3 inside thereof. The lens holder 120 is enabled to slide along the optical axis by the guide rail 1110. This makes it possible to adjust the interval between the first optical system 3 and the light source 130.

The light source 130 has a plurality of light emitters 1310 which are arranged in a line from front to back in FIG. 17, for example. A light source holder 150 is attached around the light source 130.

The light source holder 150 is formed into a ring shape having an outer diameter which is almost the same as the inner diameter of a later-described accommodation recess 160, and three abutting projections (inclination conveying parts) 1510 are formed at given intervals in the circumferential direction. The outer periphery of the light source holder 150 is a slightly curved to be convex in the outward direction.

A base 140 includes the accommodation recess 160 which accommodates the light source holder 150, a first adjusting member 170 and a second adjusting member 180 accommodated in the accommodation recess 160, and a cover member 190 which covers the light source holder 150 accommodated in the accommodation recess 160.

The accommodation recess 160 is recessed in a cylindrical shape and has a slit 1610 formed in a part of the periphery thereof along the axis direction. Also, a passage hole 1620 is formed at a bottom part of the accommodation recess 160 which allows laser irradiated from the light source 130 to pass through to the first optical system 3. The bottom surface on the inner side of the accommodation recess 160 is formed into a flat surface which is orthogonal to the optical axis of the first optical system 3.

The first adjusting member 170 and the second adjusting member 180 adjust the attitude of the light source 130 as attitude adjusting parts by adjusting the tilt of the light source holder 150 with respect to the base 14 by oscillating the light source holder 150. The first adjusting member 170 is located closer to the first optical system 3 than the light source holder 150, and the second adjusting member 180 is located closer to the first optical system 3 than the first adjusting member 170. The first adjusting member 170 and the second adjusting member 180 are both formed into a ring shape of which outer diameter is almost the same as the inner diameter of the accommodation recess 160, and rotate about the optical axis of the first optical system 3 within the accommodation recess 160.

Figure 19:
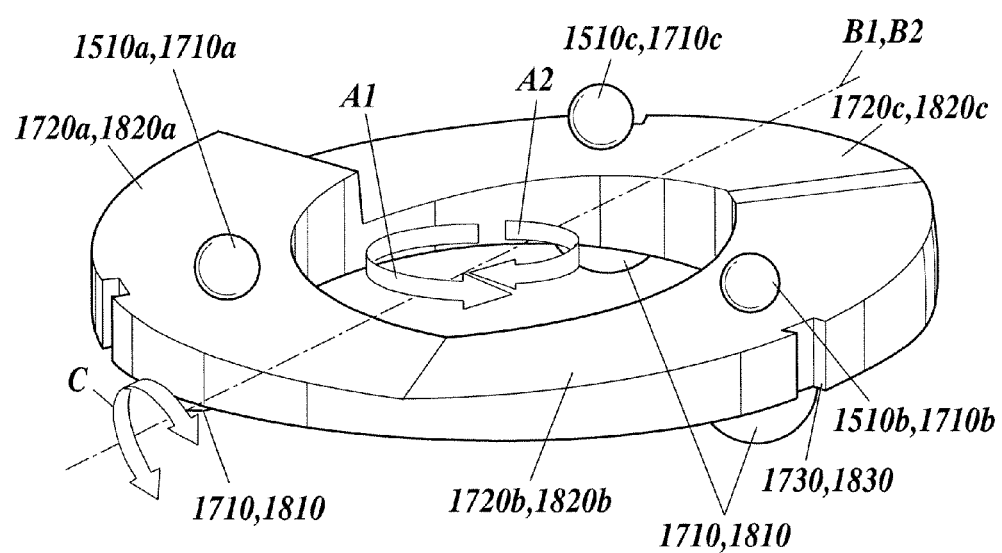
FIG. 19 is a perspective view showing a schematic structure of a first adjusting member and a second adjusting member according to the second embodiment.
Figure 20:
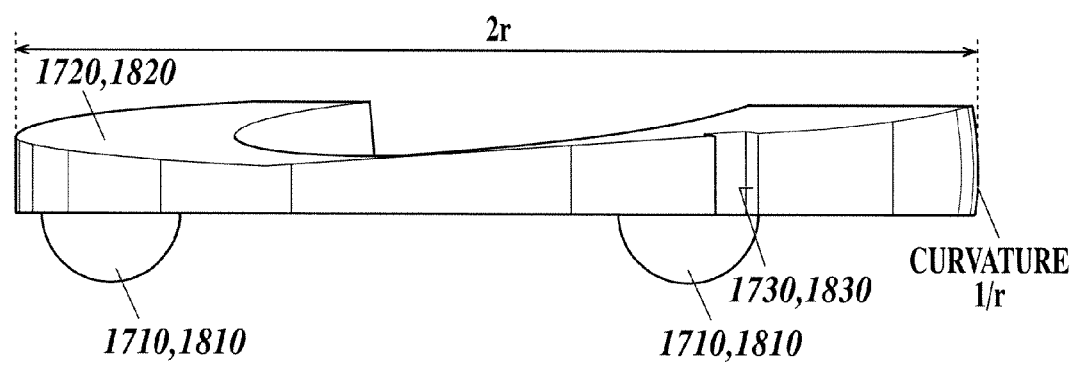
FIG. 20 is a front view of the first adjusting member and the second adjusting member of FIG. 19.

FIG. 19 is a perspective view showing a schematic structure of the first adjusting member 170 and the second adjusting member 180, and FIG. 20 is a front view of the first adjusting member 170 and the second adjusting member 180. On main surfaces of the first adjusting member 170 and the second adjusting member 180 on the side of the first optical system 3, the three abutting projections 1710 and 1810 are formed, respectively, at given intervals in the circumferential direction. On the other hand, on main surfaces of the first adjusting member 170 and the second adjusting member 180 on the side of light source 130 (abutting surfaces or second abutting surfaces), three tapered surfaces 1720 and 1820 are provided, respectively, inclined with respect to the flat surface which is orthogonal to the optical axis of the first optical system 3.

The tapered surfaces 1720 of the first adjusting member 170 are first tapered surfaces (inclined parts) according to the present invention. The three abutting projections 1510 of the light source holder 150 abut on the three tapered surfaces 1720 of the first adjusting member 170, respectively.

Also, the tapered surfaces 1820 of the second adjusting member 180 are second tapered surfaces (second inclined parts) according to the present invention. The three abutting projections (second inclination conveying parts) of the first adjusting member 170 abut on the three tapered surfaces 1820 of the second adjusting member 180, respectively. The three abutting projections 1810 of the second adjusting member 180 abut on the bottom surface of the accommodation recess 160.

The three tapered surfaces 1720 and 1820 of the first adjusting member 170 and the second adjusting member 180 will be explained. The inclination angles of the first tapered surfaces 1720a and 1820a of the three tapered surfaces 1720 and 1820 are set so as to gradually slope down towards the first optical system 3 in the counterclockwise direction A1 in FIG. 19. The inclination angles of the second tapered surfaces 1720b and 1820b of the three tapered surfaces 1720 and 1820 are set so as to gradually slope up towards the light source 130 in the counterclockwise direction A1 from the bottom ends of the first tapered surfaces 1720a and 1820a. The inclination angles of the third tapered surfaces 1720c and 1820c of the three tapered surfaces 1720 and 1820 are set so as to gradually slope down towards the first optical system 3 in the counterclockwise direction A1 from the top ends of the second tapered surfaces 1720b and 1820b. The joints between bottom ends of the third tapered surfaces 1720c and 1820c and the top ends of the first tapered surfaces 1720a and 1820a are formed as steps.

An operation of the abutting projections 1510 of the light source holder 150 which abut on the first adjusting member 170 will be explained. Here, the abutting projection 1510 corresponding to the first tapered surface 1720a is designated as the first projection 1510a, the abutting projection 1510 corresponding to the second tapered surface 1720b is designated as the second projection 1510c, the abutting projection 1510 corresponding to the third tapered surface 1720c is designated as the third projection 1510c. FIG. 19 shows a case where each of the abutting projections 1510 is located in the center position of each of the tapered surfaces 1720, and this state will be regarded as a reference position.

When only the first adjusting member 170 is rotated in the counterclockwise direction A1 from the reference position, the first projection 1510a is ascended to the side of the light source 130 by the first tapered surface 1720a, the second projection 1510b is descended to the side of the first optical system 3 by the second tapered surface 1720b, and the third projection 1510c is ascended to the side of the light source 130 by the third tapered surface 1720c.

On the other hand, when only the first adjusting member 170 is rotated in the clockwise direction A2 from the reference position, the first projection 1510a is descended to the side of the first optical system 3 by the first tapered surface 1720a, the second projection 1510b is ascended to the side of the light source 130 by the second tapered surface 1720b, and the third projection 1510c is descended to the side of the first optical system 3 by the third tapered surface 1720c.

As described above, when the first adjusting member 170 is rotated, each of the abutting projections 1510 ascends while changing the abutting position on the corresponding tapered surface 1720. In conjunction with this, the light source holder 150 oscillates along the arrow C around the center of oscillation B1, thus oscillating the light source 130 as well.

Next, an operation of the abutting projections 1710 of the first adjusting member 170 which abuts on the second adjusting member 180 will be explained. The abutting projection 1710 corresponding to the first tapered surface 1820a is designated as the first projection 1710a, the abutting projection 1710 corresponding to the second tapered surface 1820b is designated as the second projection 1710c, the abutting projection 1710 corresponding to the third tapered surface 1820c is designated as the third projection 1710c.

When only the second adjusting member 180 is rotated in the counterclockwise direction A1 from the reference position, the first projection 1710a is ascended to the side of the light source 130 by the first tapered surface 1820a, the second projection 1710b is descended to the side of the first optical system 3 by the second tapered surface 1820b, and the third projection 1710c is ascended to the side of the light source 130 by the third tapered surface 1820c.

On the other hand, when only the second adjusting member 180 is rotated in the clockwise direction A2 from the reference position, the first projection 1710a is descended to the side of the first optical system 3 by the first tapered surface 1820a, the second projection 1710b is ascended to the side of the light source 130 by the second tapered surface 1820b, and the third projection 1710c is descended to the side of the first optical system 3 by the third tapered surface 1820c.

As described above, when the second adjusting member 180 is rotated, each of the abutting projections 1810 ascends while changing the abutting position to the corresponding tapered surface 1820. In conjunction with this, the first adjusting member 170 and the light source holder 150 oscillate along the arrow C around the center of oscillation B2, thus oscillating the light source 130 as well.

Here, the centers of oscillation B1 and B2 of the first adjusting member 170 and the second adjusting member 180 intersect with the optical axis of the first optical system 3 at the point when the first adjusting member 170 and the second adjusting member 180 are located within the accommodation recess 160. Also, the first adjusting member 170 and the second adjusting member 180 are arranged in the accommodation recess 160 so that angles between the centers of oscillation B1 and B2 and the aforementioned optical axis are different from each other.

Because of this, when adjusting the attitude of the light source 130, the light source 130 can be oscillated around the two centers of oscillation B1 and B2, enabling to carry out more minute adjustments.

Further, the first adjusting member 170 and the second adjusting member 180 have notches 1730 and 1830, respectively, which face the slit 1610. The first adjusting member 170 or the second adjusting member 180 can be rotated by inserting a tool into the notches 1730 or 1830 from the slit 1610 and operating the notches 1730 or 1830.

Then, the outer periphery of the first adjusting member 170 is slightly curved to be outwardly convex as illustrated in FIG. 20. The curvature of the curved surface is 1/r where r is the radius of the first adjusting member 170. The curvature of the outer periphery of the light source holder 150 is the same. Since the outer peripherals of the light source holder 150 and the first adjusting member 170 are curved surfaces, respectively, the light source holder 150 and the first adjusting member 170 smoothly slide as they oscillate along the inner periphery of the accommodation recess 160.

Next, operations according to this embodiment will be explained.

When adjusting the light source 130, an operator inserts a tool into the slit 1610 and rotates at least one of the first adjusting member 170 and the second adjusting member 180. By this rotation, the light source holder 150 and the first adjusting member 170 oscillate and the attitude of the light source 130 changes. When the light source 130 is in a desired attitude, the operator removes the tool from the slit 1610.

As explained above, according to this embodiment, since the attitude of the light source 130 can be controlled with the light source holder 150 remaining inside the accommodation recess 160, a force which could cause a deformation is not applied to the base 140 during attitude adjustment. In particular, at least one of the first adjusting member 170 and the second adjusting member 180 is rotated around the optical axis to change the abutting positions of the abutting projections 1510 and 1710 on the tapered surfaces 1720 and 1820, which makes the light source holder 150 oscillate along the tapered surfaces 1720 and 1820, thus adjusting the attitude of the light source 130. Therefore, the attitude of the light source 130 can be can be controlled without applying a force directly to the base in the direction orthogonal to the surface direction of the base like the prior art. Hence, deformation of the base 140 which occurs when adjusting the installation attitude of the light source 130 can be prevented, thus improving accuracy of attitude control of the light source 130.

Furthermore, since the first adjusting member 170, the second adjusting member 180, and the light source holder 150 for adjusting the attitude of the light source 130 are accommodated in the accommodation recess 160 with the light source 130, the mechanism for attitude adjustment can be made compact as a whole. This enables to conserve space.

Yet further, since the three abutting projections 1510 of the light source holder 150 are provided so as to abut on the three tapered surfaces 1720 of the first adjusting member 170, respectively, the light source holder 150 is supported at three points with respect to the tapered surfaces 1720, enabling to keep the attitude of the light source holder 150 in a stable manner even when the attitude thereof is adjusted.

Similarly, since the three abutting projections 1710 of the first adjusting member 170 are provided so as to abut on the three tapered surfaces 1820 of the second adjusting member 180, respectively, the first adjusting member 170 is supported at three points with respect to the tapered surfaces 1820, enabling to keep the attitude of the first adjusting member 170 in a stable manner even when the attitude thereof is adjusted.

Note that the present invention is not limited to this embodiment and changes may be made as appropriate.

According to an aspect of the preferred embodiments of the present invention, provided is a laser scanning optical device, including:

a light source having a plurality of emission points;

a plate-like light source holder which holds the light source in a center of the light source holder;

a base arranged to face the light source holder; and an attitude adjusting part which adjusts an attitude of the light source by adjusting a tilt of the light source holder, and the attitude adjusting part includes an inclined part and an inclination conveying part, and adjusts the tilt of the light source holder with respect to the base by displacing an abutting position of the inclined part corresponding to the inclination conveying part along an inclined surface of the inclined part.

According to this embodiment, distortion of the holder is prevented which occurs while adjusting the attitude of the light source, thus enabling to improve accuracy of the attitude control of the light source.

Preferably, the plurality of inclined parts are formed on a surface of the base which faces the light source holder or on a surface of the light source holder which faces the base, the plurality of inclination conveying parts are provided to be respectively located between the inclined parts and the light source holder or the base, at least one inclined part among the plurality of inclined parts, configuring a first inclined part, and the remaining inclined parts configuring a second inclined part, are arranged to sandwich an optical axis of the light source, the inclined surface of the first inclined part and the inclined surface of the second inclined part are inclined to become closer to each other with respect to the surfaces on which the inclined parts are provided, as being distanced from the optical axis, and the tilt of the light source holder is adjusted with respect to the base by displacing the abutting position of the respective plurality of inclination conveying parts on the respectively corresponding inclined parts, along the inclined surface.

According to this embodiment, the attitude of the light source can be controlled without directly applying a force to the light source holder in the orthogonal direction to the surface direction of the light source holder to control the attitude of a light source like the prior art. This makes it possible to prevent deformation of the light source holder which occurs while adjusting the installation attitude of the light source and improve accuracy of the attitude control of the light source.

Preferably, the laser scanning optical device further includes a holder position controlling part which controls a position of the light source holder with respect to a direction of movement when displacing the abutting position.

According to this embodiment, since the position of the light source holder is controlled with respect to the movement direction when the holder position controlling part displaces the abutting positions, the attitude of the light source can be adjusted without displacing the position of the light source holder.

Preferably, the inclination conveying part is separated from the light source holder and the base, and the attitude adjusting part includes a slide member which slides the plurality of inclination conveying parts so that the abutting position of the respective plurality of inclination conveying parts on the respectively corresponding inclined parts is displaced along the inclined surface.

According to this embodiment, the abutting positions can be displaced by sliding the inclination conveying parts at one time.

Preferably, the laser scanning optical device further includes a slide mechanism which slides the plurality of inclination conveying parts by sliding the sliding member with respect to the surface of the base.

According to this embodiment, since the slide mechanism slides the plurality of inclination conveying parts by sliding the sliding member with respect to the opposite surface of the base, better operability is obtained than directly sliding the sliding member.

Preferably, the laser scanning optical device further includes a pressing member which presses the light source holder to the base.

According to this embodiment, since the light source holder is pressed to the base by the pressing members, the positional relation between the light source holder and the base can be prevented from largely misaligned.

Preferably, the laser scanning optical device further includes a support stand which slideably holds the base, and the inclination conveying parts are formed integrally with the light source holder, and the attitude adjusting part includes a slide mechanism which slides the base so that the abutting position of the respective plurality of inclination conveying parts on the respectively corresponding inclined parts is displaced along the inclined surface.

According to this embodiment, since the inclination conveying parts are ascended or descended by inclined surfaces, the light source holder rotates about an axis of rotation.

Preferably, the laser scanning optical device further includes a pressing member which presses the light source holder to the support stand.

According to this embodiment, the light source holder can be pressed onto the support stand on the base by the pressing member.

Preferably, the plurality of light emission points are arranged along a direction orthogonal to an axis of rotation when the light source holder oscillates by displacing the abutting position along the inclined surface.

According to this embodiment, the attitude of the light source can be adjusted without tilting the arrangement of the plurality of light emission points.

Preferably, an interval between the plurality of light emission points and the base is same as an interval between the axis of rotation and the base.

According to this embodiment, the amount of rotation of the light source holder and the amount of displacement of the light emission points during attitude adjustment can be equalized. Thus, more accurate attitude control becomes possible.

Preferably, the laser scanning optical device further includes a collimator lens which converts diverging light from the light source into parallel light, and the base holds the light source through the light source holder, the base includes an accommodation recess which accommodates the light source holder slideably along an outer periphery of the light source holder, and a first adjusting member rotatably accommodated in the accommodation recess about an optical axis of the collimator lens, at least one of the inclination conveying parts abutting on the first adjusting member is formed in the light source holder, at least one of the inclined parts which is inclined with respect to a flat surface orthogonal to the optical axis direction is formed on an abutting surface of the first adjusting member on which the inclination conveying part abuts, and the first adjusting member is rotated about the optical axis to change the abutting position of the inclination conveying part on the inclined part, which makes the light source holder oscillate along the inclined part, thus adjusting the attitude of the light source.

According to this embodiment, since the attitude of the light source can be controlled with the light source holder remaining accommodated in the accommodation recess, a force which could cause a deformation is difficult to be applied to the light source holder during attitude adjustment.

Preferably, three of the inclined parts are formed, and three of the inclination conveying parts are provided so as to abut on the three inclined parts, respectively.

According to this embodiment, the light source holder is supported at three points with respect to the inclined surface (first tapered surface), enabling to keep the attitude of the light source holder in a stable manner even during attitude adjustment.

Preferably, the base further includes a second adjusting member which is located in the accommodation recess on an opposite side of the abutting surface of the first adjusting member and is rotatably accommodated about the optical axis of the collimator lens, at least one second inclination conveying part which abuts on the second adjusting member is formed on an opposite side of the abutting surface of the first adjusting member, at least one third inclined part which is inclined with respect to the flat surface orthogonal to the optical axis direction is formed on a second abutting surface of the second adjusting member on which the second inclination conveying part abuts, and at least one of the first adjusting member and the second adjusting member is rotated around the optical axis to change an abutting position of the second inclination conveying part on the third inclined part, which makes the first adjusting member oscillates along the third inclined part, thus adjusting the attitude of the light source through the first adjusting member.

According to this embodiment, the attitude of the light source can be controlled without applying a force directly to the base in the direction orthogonal to the surface direction of the base like the prior art. Hence, deformation of the base which occurs when adjusting the installation attitude of the light source can be prevented, thus improving accuracy of attitude control of the light source.

Preferably, a center of oscillation when the light source holder oscillates along the inclined part, and a center of oscillation when the first adjusting member oscillates along the third inclined part intersect with the optical axis, and form different angles with respect to the optical axis.

According to this embodiment, when adjusting the attitude of the light source, the light source can be oscillated around the two centers of oscillation, enabling to carry out more minute adjustments.

Preferably, three of the third inclined parts are formed, and three of the second inclination conveying parts are provided so as to abut on the three third inclined parts, respectively.

According to this embodiment, the first adjusting member is supported at three points with respect to the inclined surface (second tapered surface), enabling to keep the attitude of the first adjusting member in a stable manner even during the attitude adjustment.

What is claimed is:

1. A laser scanning optical device, comprising:
a light source having a plurality of emission points;
a plate-like light source holder which holds the light source in a center of the light source holder;
a base arranged to face the light source holder; and
an attitude adjusting part which adjusts an attitude of the light source by adjusting a tilt of the light source holder,
wherein the attitude adjusting part includes an inclined part and an inclination conveying part, and adjusts the tilt of the light source holder with respect to the base by displacing an abutting position of the inclined part corresponding to the inclination conveying part along an inclined surface of the inclined part,
wherein the inclined part is one of a plurality of inclined parts formed on a surface of the base which faces the light source holder or on a surface of the light source holder which faces the base,
the inclination conveying part is one of a plurality of inclination conveying parts provided to be respectively located between the inclined parts and the light source holder or the base,
at least one inclined part among the plurality of inclined parts, configuring a first inclined part, and the remaining inclined parts configuring a second inclined part, are arranged to sandwich an optical axis of the light source,
the inclined surface of the first inclined part and the inclined surface of the second inclined part are inclined to become closer to each other with respect to the surfaces on which the inclined parts are provided, as being distanced from the optical axis, and
the tilt of the light source holder is adjusted with respect to the base by displacing the abutting position of the respective plurality of inclination conveying parts on the respectively corresponding inclined parts, along the inclined surface.

2. The laser scanning optical device according to claim 1, further comprising a holder position controlling part which controls a position of the light source holder with respect to a direction of movement when displacing the abutting position.

3. The laser scanning optical device according to claim 2, wherein the inclination conveying part is separated from the light source holder and the base, and
the attitude adjusting part includes a slide member which slides the plurality of inclination conveying parts so that the abutting position of the respective plurality of inclination conveying parts on the respectively corresponding inclined parts is displaced along the inclined surface.

4. The laser scanning optical device according to claim 3, further comprising a slide mechanism which slides the plurality of inclination conveying parts by sliding the sliding member with respect to the surface of the base.

5. The laser scanning optical device according to claim 2, further comprising a support stand which slidably holds the base,
wherein the inclination conveying parts are formed integrally with the light source holder, and
the attitude adjusting part includes a slide mechanism which slides the base so that the abutting position of the respective plurality of inclination conveying parts on the respectively corresponding inclined parts is displaced along the inclined surface.

6. The laser scanning optical device according to claim 5, further comprising a pressing member which presses the light source holder to the support stand.

7. The laser scanning optical device according to claim 1, further comprising a pressing member which presses the light source holder to the base.

8. The laser scanning optical device according to claim 1, wherein the plurality of light emission points are arranged along a direction orthogonal to an axis of rotation when the light source holder oscillates by displacing the abutting position along the inclined surface.

9. The laser scanning optical device according to claim 8, wherein an interval between the plurality of light emission points and the base is same as an interval between the axis of rotation and the base.

10. A laser scanning optical device, comprising:
a light source having a plurality of emission points;
a plate-like light source holder which holds the light source in a center of the light source holder;
a base arranged to face the light source holder;
an attitude adjusting part which adjusts an attitude of the light source by adjusting a tilt of the light source holder, wherein the attitude adjusting part includes an inclined part and an inclination conveying part, and adjusts the tilt of the light source holder with respect to the base by displacing an abutting position of the inclined part corresponding to the inclination conveying part along an inclined surface of the inclined part; and
a collimator lens which converts diverging light from the light source into parallel light,
wherein the base holds the light source through the light source holder,
the base includes an accommodation recess which accommodates the light source holder slidably along an outer periphery of the light source holder, and a first adjusting member rotatably accommodated in the accommodation recess about an optical axis of the collimator lens,
the inclination conveying part is one of a plurality of inclination conveying parts, at least one of the inclination conveying parts abutting on the first adjusting member is formed in the light source holder,
the inclined part is one of a plurality of inclined parts, at least one of the inclined parts which is inclined with respect to a flat surface orthogonal to the optical axis direction is formed on an abutting surface of the first adjusting member on which the inclination conveying part abuts, and
the first adjusting member is rotated about the optical axis to change the abutting position of the inclination conveying part on the inclined part, which makes the light source holder oscillate along the inclined part, thus adjusting the attitude of the light source.

11. The laser scanning optical device according to claim 10, wherein three of the inclined parts are formed, and three of the inclination conveying parts are provided so as to abut on the three inclined parts, respectively.

12. The laser scanning optical device according to claim 10,
wherein the base further includes a second adjusting member which is located in the accommodation recess on an opposite side of the abutting surface of the first adjusting member and is rotatably accommodated about the optical axis of the collimator lens,
at least one second inclination conveying part which abuts on the second adjusting member is formed on an opposite side of the abutting surface of the first adjusting member,
at least one third inclined part which is inclined with respect to the flat surface orthogonal to the optical axis direction is formed on a second abutting surface of the second adjusting member on which the second inclination conveying part abuts, and
at least one of the first adjusting member and the second adjusting member is rotated around the optical axis to change an abutting position of the second inclination conveying part on the third inclined part, which makes the first adjusting member oscillates along the third inclined part, thus adjusting the attitude of the light source through the first adjusting member.

13. The laser scanning optical device according to claim 12, wherein a center of oscillation when the light source holder oscillates along the inclined part, and a center of oscillation when the first adjusting member oscillates along the third inclined part intersect with the optical axis, and form different angles with respect to the optical axis.

14. The laser scanning optical device according to claim 13, wherein three of the third inclined parts are formed, and three of the second inclination conveying parts are provided so as to abut on the three third inclined parts, respectively.

15. A laser scanning optical device, comprising:
a light source having a plurality of emission points;
a plate-like light source holder which holds the light source in a center of the light source holder;
a base arranged to face the light source holder; and
an attitude adjusting part which adjusts an attitude of the light source by adjusting a tilt of the light source holder,
wherein the attitude adjusting part includes an inclined part and an inclination conveying part which is disposed between the base and the light source holder, and the attitude adjusting part adjusts the tilt of the light source holder with respect to the base by displacing an abutting position of the inclined part corresponding to the inclination conveying part along an inclined surface of the inclined part.

16. The laser scanning optical device according to claim 15, wherein
the inclined surface of the inclined part is formed on a part of an opposite surface of the base which faces the light source holder, and the inclined surface is formed in such a way that, when the opposite surface of the base and an opposite surface of the light source holder are arranged in parallel with each other, the inclined surface becomes closer to the light source holder.

17. The laser scanning optical device according to claim 15, wherein a first surface, which faces the base, of the inclination conveying part can come into contact with a surface of the base which faces the inclination conveying part, and a second surface of the inclination conveying part can come into contact with the light source holder, the second surface being on a side opposite to the first surface of the inclination conveying part in an optical axis direction.

* * * * *